United States Patent
Wietfeldt et al.

(10) Patent No.: US 11,513,991 B2
(45) Date of Patent: Nov. 29, 2022

(54) BATCH OPERATION ACROSS AN INTERFACE

(71) Applicant: QUALCOMM Incorporated, San Diego, CA (US)

(72) Inventors: Richard Dominic Wietfeldt, San Diego, CA (US); Lalan Jee Mishra, San Diego, CA (US); Radu Pitigoi-Aron, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/061,357

(22) Filed: Oct. 1, 2020

(65) Prior Publication Data

US 2022/0107912 A1   Apr. 7, 2022

(51) Int. Cl.
*G06F 13/42*   (2006.01)

(52) U.S. Cl.
CPC .. *G06F 13/4282* (2013.01); *G06F 2213/0016* (2013.01); *G06F 2213/0038* (2013.01); *G06F 2213/3808* (2013.01)

(58) Field of Classification Search
CPC combination set(s) only.
See application file for complete search history.

(56) References Cited

U.S. PATENT DOCUMENTS

| | | | |
|---|---|---|---|
| 8,364,638 B2 * | 1/2013 | Nickolov | H04L 67/101 707/831 |
| 8,887,156 B2 * | 11/2014 | Chambers | G06F 8/433 718/1 |
| 9,563,398 B2 * | 2/2017 | Mishra | G06F 5/065 |
| 10,872,049 B2 * | 12/2020 | Kessler | G06F 13/364 |
| 10,949,365 B2 * | 3/2021 | Jacobs | G06F 13/42 |
| 2015/0301979 A1 * | 10/2015 | Mishra | G06F 13/4022 710/106 |
| 2016/0224489 A1 * | 8/2016 | Mishra | G06F 13/364 |
| 2016/0259702 A1 * | 9/2016 | Mishra | G06F 1/3209 |
| 2017/0039162 A1 * | 2/2017 | Mishra | G06F 13/385 |
| 2017/0075852 A1 * | 3/2017 | Mishra | G06F 13/4282 |
| 2018/0329856 A1 * | 11/2018 | Mishra | G06F 13/102 |
| 2018/0359117 A1 * | 12/2018 | Wietfeldt | G06F 13/4282 |
| 2019/0050366 A1 * | 2/2019 | Mishra | G06F 9/30101 |
| 2019/0129881 A1 * | 5/2019 | Wietfeldt | G06F 9/542 |

FOREIGN PATENT DOCUMENTS

| | | |
|---|---|---|
| CN | 106375077 A | 2/2017 |
| TW | I576694 B | 4/2017 |

OTHER PUBLICATIONS

International Search Report and Written Opinion—PCT/US2021/044017—ISA/EPO—dated Nov. 23, 2021.

* cited by examiner

*Primary Examiner* — Henry Tsai
*Assistant Examiner* — Christopher A Bartels
(74) *Attorney, Agent, or Firm* — Qualcomm Incorporated

(57) ABSTRACT

Systems, methods, and apparatus for communication virtualized general-purpose input/output (GPIO) signals and control messages over a serial communication link. An apparatus includes a serial bus, and a controller configured to represent a series of signaling state of physical general-purpose input/output (GPIO) in a batch that comprises a sequence of virtual GPIO messages and control messages, generate a first header that includes timing information configured to control timing of execution of the batch, transmit the first header over a communication link, and transmit the batch over the communication link.

30 Claims, 21 Drawing Sheets

BATCH OPERATION ACROSS AN INTERFACE

TECHNICAL FIELD

The present disclosure relates generally to serial communication and input/output pin configuration and, more particularly, to transmission of virtual general-purpose input/output state and events in batches that can be executed at a receiver.

BACKGROUND

Mobile communication devices may include a variety of components including circuit boards, integrated circuit (IC) devices and/or System-on-Chip (SoC) devices. The components may include processing devices, user interface components, storage and other peripheral components that communicate through a shared data communication bus, which may include a multi-drop serial bus or a parallel bus. General-purpose serial interfaces known in the industry include the Inter-Integrated Circuit (I2C or $I^2C$) serial interface and its derivatives and alternatives.

The Mobile Industry Processor Interface (MIPI) Alliance defines standards for the Improved Inter-Integrated Circuit (I3C) serial interface, the Radio Frequency Front-End (RFFE) interface, the System Power Management Interface (SPMI) and other interfaces. These interfaces may be used to connect processors, sensors and other peripherals, for example. In some interfaces, multiple bus masters are coupled to the serial bus such that two or more devices can serve as bus master for different types of messages transmitted on the serial bus.

RFFE standards define a communication interface that may be used for controlling various radio frequency (RF) front-end devices, including power amplifier (PA), low-noise amplifiers (LNAs), antenna tuners, filters, sensors, power management devices, switches, etc. These devices may be collocated in a single IC device or provided in multiple IC devices. In a mobile communications device, multiple antennas and radio transceivers may support multiple concurrent RF links. SPMI standards define a hardware interface that may be implemented between baseband or application processors and peripheral components. In some instances, SPMI protocols are implemented to support power management operations within a device.

In some systems, signals are transmitted on physical input/output (I/O) connections between different component devices in mobile communication devices. These connections consume precious general-purpose input/output (GPIO) pins within the mobile communication devices and it is desirable to replace the physical interconnects with signals carried in information transmitted over existing serial data links. However, the serial data links are associated with latencies that can prevent conversion of physical command and control signals to virtual signals, particularly in real-time embedded system applications supported by mobile communication devices that define firm transmission deadlines.

As mobile communication devices continue to include a greater level of functionality, improved serial communication techniques are needed to support transmission of mixed virtual GPIO state information between peripherals and application processors.

SUMMARY

Certain aspects of the disclosure relate to systems, apparatus, methods and techniques that can provide optimized low-latency communications between different devices such that physical GPIO state and signals may be carried as virtual GPIO state and signals. One or more virtual GPIO finite state machines (VGI FSMs) are provided that can consolidate heterogeneous GPIO state information of multiple types and from multiple sources, and distribute the state information to one or more devices over a data communication bus. In one aspect, heterogeneous GPIO state information includes information corresponding to input and output GPIO pins.

In various aspects of the disclosure, a method performed at a data communication device includes representing a series of signaling state of physical GPIO in a batch that comprises a sequence of virtual GPIO messages, generating a first header that includes timing information configured to control timing of execution of the batch, transmitting the first header over a communication link, and transmitting the batch over the communication link.

In various aspects of the disclosure, a data communication apparatus has a transceiver circuit configured to couple the apparatus to a remote device through a communication link and a controller configured to represent a series of signaling state of physical GPIO in a batch that comprises a sequence of virtual GPIO messages, generate a first header that includes timing information configured to control timing of execution of the batch, transmit the first header over a communication link, and transmit the batch over the communication link.

In various aspects of the disclosure, a method performed at a data communication device includes receiving a batch comprising a sequence of virtual general-purpose input/output (GPIO) messages representing a series of signaling state of physical GPIO, receiving a first header that includes timing information configured to control timing of execution of the batch, and extracting the GPIO signaling state from the sequence of virtual GPIO messages using the timing information.

In various aspects of the disclosure, a data communication apparatus has a transceiver circuit configured to receive a batch comprising a sequence of virtual GPIO messages representing a series of signaling state of physical GPIO, receive a first header that includes timing information configured to control timing of execution of the batch, and extract the GPIO signaling state from the sequence of virtual GPIO messages using the timing information.

DETAILED DESCRIPTION

Figure 1:
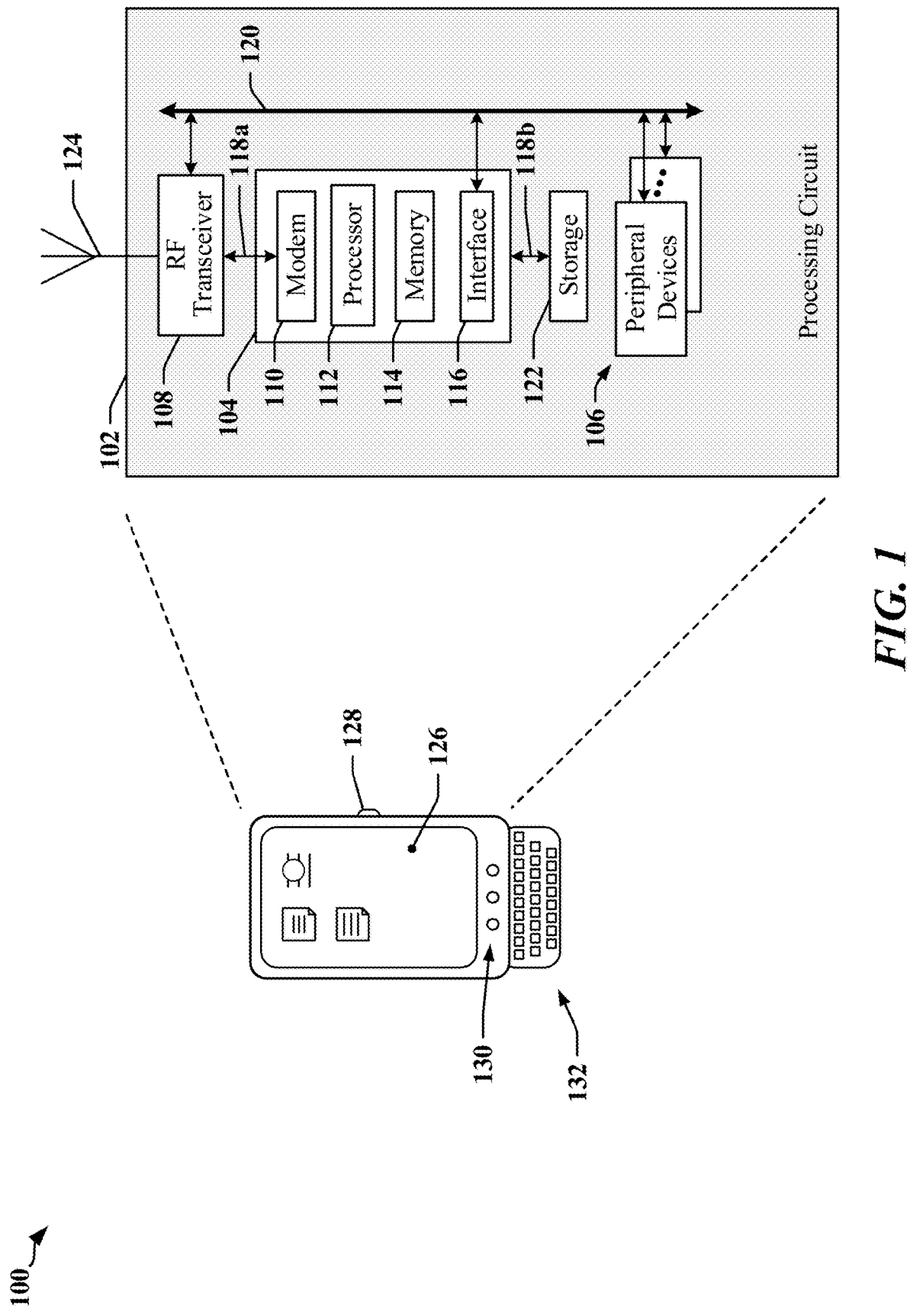
FIG. 1 illustrates an apparatus employing a data link between IC devices that is selectively operated according to one of plurality of available standards.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of the invention will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

Overview

Devices that include multiple SoCs and other IC devices often employ a shared communication interface that may include a serial bus or other data communication link to connect processors with modems and other peripherals. The serial bus or other data communication link may be operated in accordance with multiple standards or protocols defined. In one example, a serial bus may be operated in accordance with I2C, I3C, SPMI, and/or RFFE protocols. According to certain aspects disclosed herein, the signaling state of a GPIO pin, trace, connector or terminal may be represented in one or more bits of virtual GPIO state information transmitted in a VGI message over a data communication link. Virtual GPIO state information may be transmitted over a variety of communication links, including links that include wired and wireless communication links. For example, virtual GPIO state information can be packetized or otherwise formatted for transmission over wireless networks including Bluetooth, Wireless LAN, cellular networks, etc. Examples involving wired communication links are described herein to facilitate understanding of certain aspects. These aspects can equally apply to implementations in which transmission of GPIO state information includes transmission over wireless networks.

Certain aspects disclosed herein provide methods, circuits and systems that are adapted to enable a device to represent software events and software-initiated events in virtual GPIO state information that can be transmitted in batches of VGI messages with timing information over a serial communication link. The batches may be executed in accordance with the timing information to monitor, control and operate peripherals located in remote devices. Communication with the remote devices may be effected using wired or wireless communication technologies.

Examples of Apparatus that Employ Serial Data Links

According to certain aspects, a serial data link may be used to interconnect electronic devices that are subcomponents of an apparatus such as a cellular phone, a smart phone, a session initiation protocol (SIP) phone, a laptop, a notebook, a netbook, a smartbook, a personal digital assistant (PDA), a satellite radio, a global positioning system (GPS) device, a smart home device, intelligent lighting, a multimedia device, a video device, a digital audio player (e.g., MP3 player), a camera, a game console, an entertainment device, a vehicle component, a wearable computing device (e.g., a smart watch, a health or fitness tracker, eyewear, etc.), an appliance, a sensor, a security device, a vending machine, a smart meter, a drone, a multicopter, or any other similar functioning device.

FIG. 1 illustrates an example of an apparatus 100 that may employ a data communication bus. The apparatus 100 may include an SoC a processing circuit 102 having multiple circuits or devices 104, 106 and/or 108, which may be implemented in one or more ASICs or in an SoC. In one example, the apparatus 100 may be a communication device and the processing circuit 102 may include a processing device provided in an ASIC 104, one or more peripheral devices 106, and a transceiver 108 that enables the apparatus to communicate through an antenna 124 with a radio access network, a core access network, the Internet and/or another network.

The ASIC 104 may have one or more processors 112, one or more modems 110, on-board memory 114, a bus interface circuit 116 and/or other logic circuits or functions. The processing circuit 102 may be controlled by an operating system that may provide an application programming interface (API) layer that enables the one or more processors 112 to execute software modules residing in the on-board memory 114 or other processor-readable storage 122 provided on the processing circuit 102. The software modules may include instructions and data stored in the on-board memory 114 or processor-readable storage 122. The ASIC 104 may access its on-board memory 114, the processor-readable storage 122, and/or storage external to the processing circuit 102. The on-board memory 114, the processor-readable storage 122 may include read-only memory (ROM) or random-access memory (RAM), electrically erasable programmable ROM (EEPROM), flash cards, or any memory device that can be used in processing systems and computing platforms. The processing circuit 102 may include, implement, or have access to a local database or other parameter storage that can maintain operational parameters and other information used to configure and operate the apparatus 100 and/or the processing circuit 102. The local database may be implemented using registers, a database module, flash memory, magnetic media, EEPROM, soft or hard disk, or the like. The processing circuit 102 may also be operably coupled to external devices such as the antenna 124, a display 126, operator controls, such as switches or buttons 128, 130 and/or an integrated or external keypad 132, among other components. A user interface module may be configured to operate with the display 126, external keypad 132, etc. through a dedicated communication link or through one or more serial data interconnects.

The processing circuit 102 may provide one or more buses 118a, 118b, 120 that enable certain devices 104, 106, and/or 108 to communicate. In one example, the ASIC 104 may include a bus interface circuit 116 that includes a combination of circuits, counters, timers, control logic and other configurable circuits or modules. In one example, the bus interface circuit 116 may be configured to operate in accordance with standards-defined communication specifications or protocols. The processing circuit 102 may include or control a power management function that configures and manages the operation of the apparatus 100.

Figure 2:
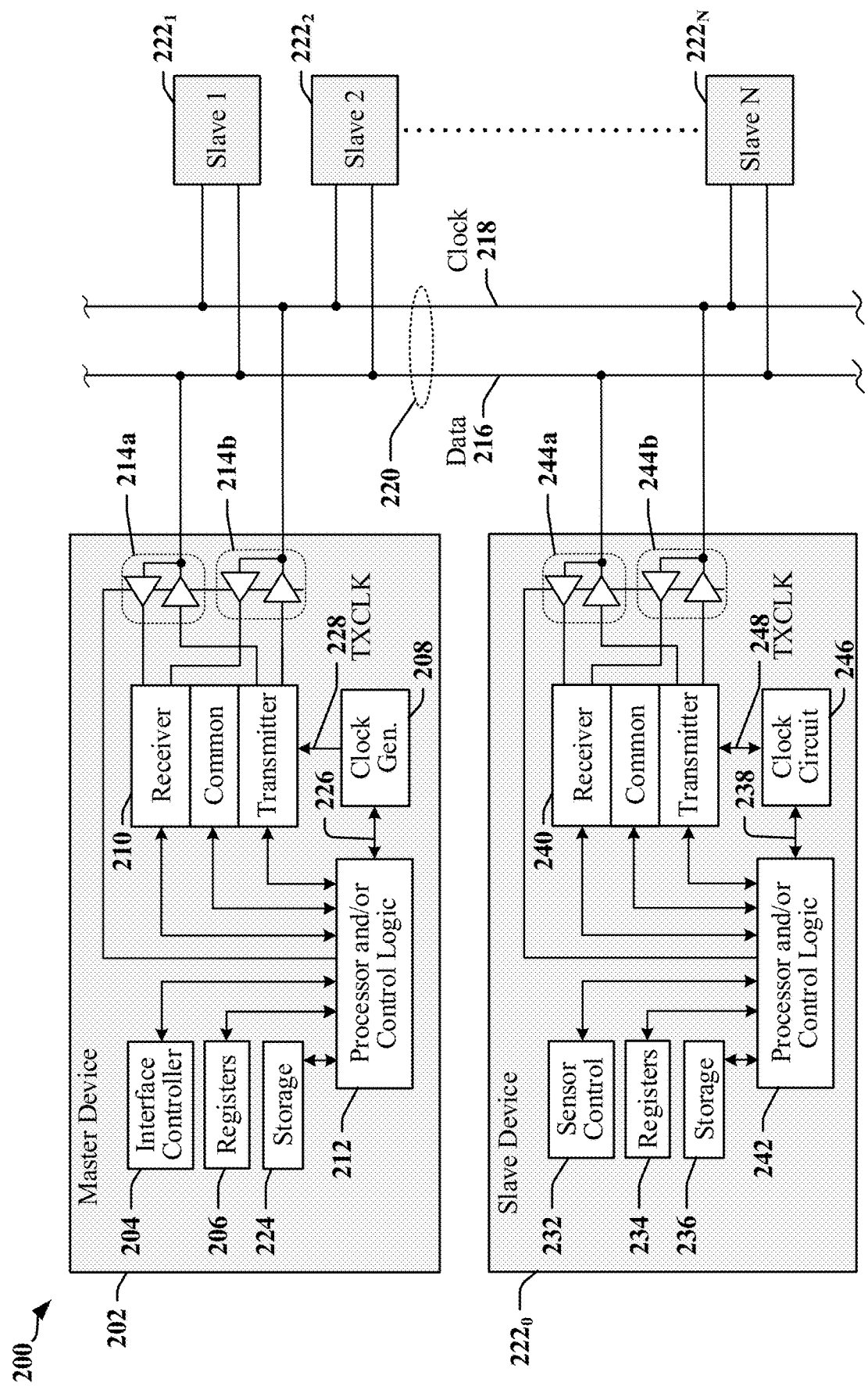
FIG. 2 illustrates a system architecture for an apparatus employing a data link between IC devices.

FIG. 2 illustrates certain aspects of an apparatus 200 that includes multiple devices 202, and $222_0$-$222_N$ coupled to a serial bus 220. The devices 202 and $222_0$-$222_N$ may be implemented in one or more semiconductor IC devices, such as an application processor, SoC or ASIC. In various implementations the devices 202 and $222_0$-$222_N$ may include, support or operate as a modem, a signal processing device, a display driver, a camera, a user interface, a sensor, a sensor controller, a media player, a transceiver, RFFE devices, and/or other such components or devices. In some examples, one or more of the slave devices $222_0$-$222_N$ may be used to control, manage or monitor a sensor device. Communication between devices 202 and $222_0$-$222_N$ over the serial bus 220 is controlled by a bus master device 202. Certain types of bus can support multiple bus master devices 202.

In one example, a master device 202 may include an interface controller 204 that manages access to the serial bus, configures dynamic addresses for slave devices $222_0$-$222_N$ and/or causes a clock signal 228 to be transmitted on a clock line 218 of the serial bus 220. The master device 202 may include configuration registers 206 or other storage 224 and other control logic 212 configured to handle protocols and/or higher level functions. The control logic 212 may include a processing circuit or device such as a state machine, sequencer, signal processor or general-purpose processor. The master device 202 includes a transceiver 210 and line drivers/receivers 214a and 214b. The transceiver 210 may include receiver, transmitter and common circuits, where the common circuits may include timing, logic and storage circuits and/or devices. In one example, the transmitter encodes and transmits data based on timing in the clock signal 228 provided by a clock generation circuit 208.

Other timing clocks 226 may be used by the control logic 212 and other functions, circuits or modules.

At least one device $222_0$-$222_N$ may be configured to operate as a slave device on the serial bus 220 and may include circuits and modules that support a display, an image sensor, and/or circuits and modules that control and communicate with one or more sensors that measure environmental conditions. In one example, a slave device $222_0$ configured to operate as a slave device may provide a control function, module or circuit 232 that includes circuits and modules to support a display, an image sensor, and/or circuits and modules that control and communicate with one or more sensors that measure environmental conditions. The slave device $222_0$ may include configuration registers 234 or other storage 236, control logic 242, a transceiver 240 and line drivers/receivers 244a and 244b. The control logic 242 may include a processing circuit or device such as a state machine, sequencer, signal processor or general-purpose processor. The transceiver 240 may include receiver, transmitter and common circuits, where the common circuits may include timing, logic and storage circuits and/or devices. In one example, the transmitter encodes and transmits data based on timing in a clock signal 248 provided by clock generation and/or recovery circuits 246. The clock signal 228 may be derived from a signal received from the clock line 218. Other timing clocks 238 may be used by the control logic 242 and other functions, circuits or modules.

The serial bus 220 may be operated in accordance with an I2C protocol, I3C protocol, RFFE protocol, SPMI protocol, or another protocol. At least one device 202, 2220-222N may be configured to selectively operate as either a master device or a slave device on the serial bus 220. Two or more devices 202, 2220-222N may be configurable to operate as a master device on the serial bus 220.

In some implementations, the serial bus 220 may be operated in accordance with an I3C protocol. Devices that communicate using the I3C protocol can coexist on the same serial bus 220 with devices that communicate using I2C protocols. The I3C protocols may support different communication modes, including a single data rate (SDR) mode that is compatible with I2C protocols. High-data-rate (HDR) modes may provide a data transfer rate between 6 megabits per second (Mbps) and 16 Mbps, and some HDR modes may be provide higher data transfer rates. I2C protocols may conform to de facto I2C standards providing for data rates that may range between 100 kilobits per second (kbps) and 3.2 Mbps. I2C and I3C protocols may define electrical and timing aspects for signals transmitted on the 2-wire serial bus 220, in addition to data formats and aspects of bus control. In some aspects, the I2C and I3C protocols may define direct current (DC) characteristics affecting certain signal levels associated with the serial bus 220, and/or alternating current (AC) characteristics affecting certain timing aspects of signals transmitted on the serial bus 220. In some examples, data is transmitted on a data line 216 of the serial bus 220 based on timing information provided in a clock signal transmitted on the clock line 218 of the serial bus 220. In some instances, data may be encoded in the signaling state, or transitions in signaling state of both the data line 216 and the clock line 218.

Figure 3:
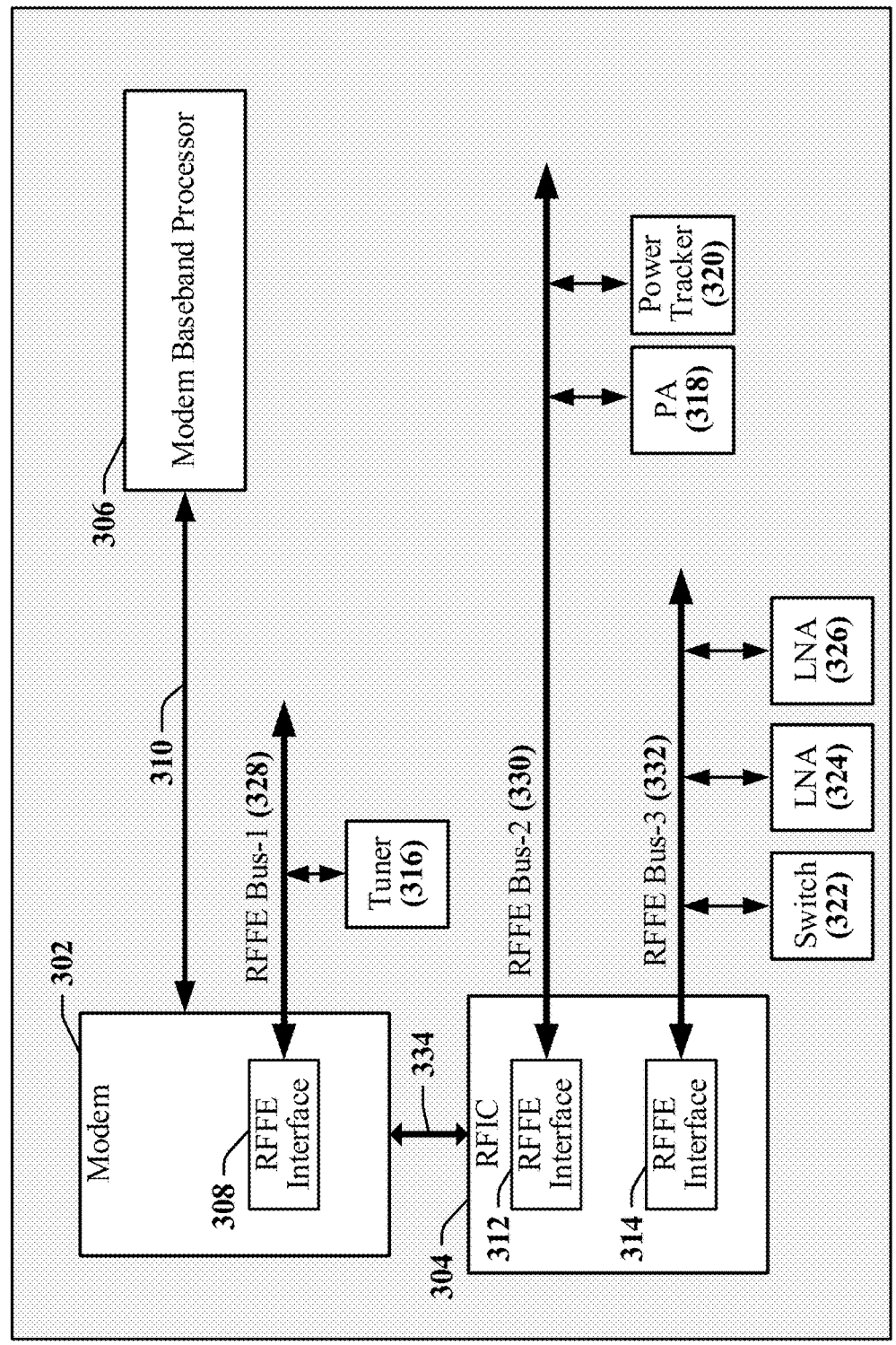
FIG. 3 illustrates a system that uses multiple RFFE buses to couple various radio frequency front-end devices.

FIG. 3 illustrates certain aspects of an apparatus 300 that includes multiple RFFE buses 328, 330, 332 configured coupled to various RF front-end devices 316, 318, 320, 322, 324, 326. A modem 302 includes an RFFE interface 308 that couples the modem 302 to a first RFFE bus 328. The modem 302 may communicate with a baseband processor 306 and a Radio-Frequency IC (RFIC 304) through one or more communication links 310, 334. The illustrated apparatus 300 may be embodied in a mobile communication device, a mobile telephone, a mobile computing system, a mobile telephone, a notebook computer, a tablet computing device, a media player, a gaming device, a wearable computing and/or communications device, an appliance, or the like.

In various examples, the apparatus 300 may be implemented with one or more baseband processors 306, modems 302, RFICs 304, multiple communications links 310, 334, multiple RFFE buses 328, 330, 332 and/or other types of buses. The apparatus 300 may include other processors, circuits or modules and may be configured for various operations and/or different functionalities. In the example illustrated in FIG. 3, the modem 302 is coupled to an RF tuner 316 through its RFFE interface 308 and the first RFFE bus 328. The RFIC 304 may include one or more RFFE interfaces 312, 314, controllers, state machines and/or processors that can configure and control certain aspects of the RF front-end. The RFIC 304 may communicate with a PA 318 and a power tracking module 320 through a first of its RFFE interfaces 312 and the second RFFE bus 330. The RFIC 304 may communicate with a switch 322 and one or more LNAs 324, 326.

Bus latency can affect the ability of a serial bus to handle high-priority, real-time or other time-constrained messages. Low-latency messages, or messages requiring low bus latency, may relate to sensor status, device-generated real-time events and virtualized GPIO. In one example, bus latency may be measured as the time elapsed between a message becoming available for transmission and the delivery of the message or, in some instances, commencement of transmission of the message. Other measures of bus latency may be employed. Bus latency typically includes delays incurred while higher priority messages are transmitted, interrupt processing, the time required to terminate a datagram in process on the serial bus, the time to transmit commands causing bus turnaround between transmit mode and receive mode, bus arbitration or command transmissions specified by protocol.

In certain examples, latency-sensitive messages may include coexistence messages. Coexistence messages are transmitted in a multisystem platform to prevent or reduce instances of certain device types impinging on each other, including for example, switches 322, LNAs 324, 326, PAs 318 and other types of device that operate concurrently in a manner that can generate inter-device interference, or that could potentially cause damage to one or more active devices through high-power electromagnetic interference. Devices that can interfere with one another may exchange coexistence management (CxM) messages to permit each device to signal imminent actions that may result in interference or conflict. CxM messages may be used to manage operation of shared components including a switch 322, LNA 324, 326, PA 318 and/or an antenna.

Multi-drop interfaces such as RFFE, SPMI, I3C, etc. can reduce the number of physical I/O pins used to communicate between multiple devices. Protocols that support communication over a multi-drop serial bus define a datagram structure used to transmit command, control and data payloads. Datagram structures for different protocols define certain common features, including addressing used to select devices to receive or transmit data, clock generation and management, interrupt processing and device priorities. In this disclosure, the example of RFFE protocols is employed to illustrate certain aspects disclosed herein. However, the concepts disclosed herein are applicable to other serial bus protocols and standards.

Signaling Virtual GPIO Configuration Information

Figure 4:
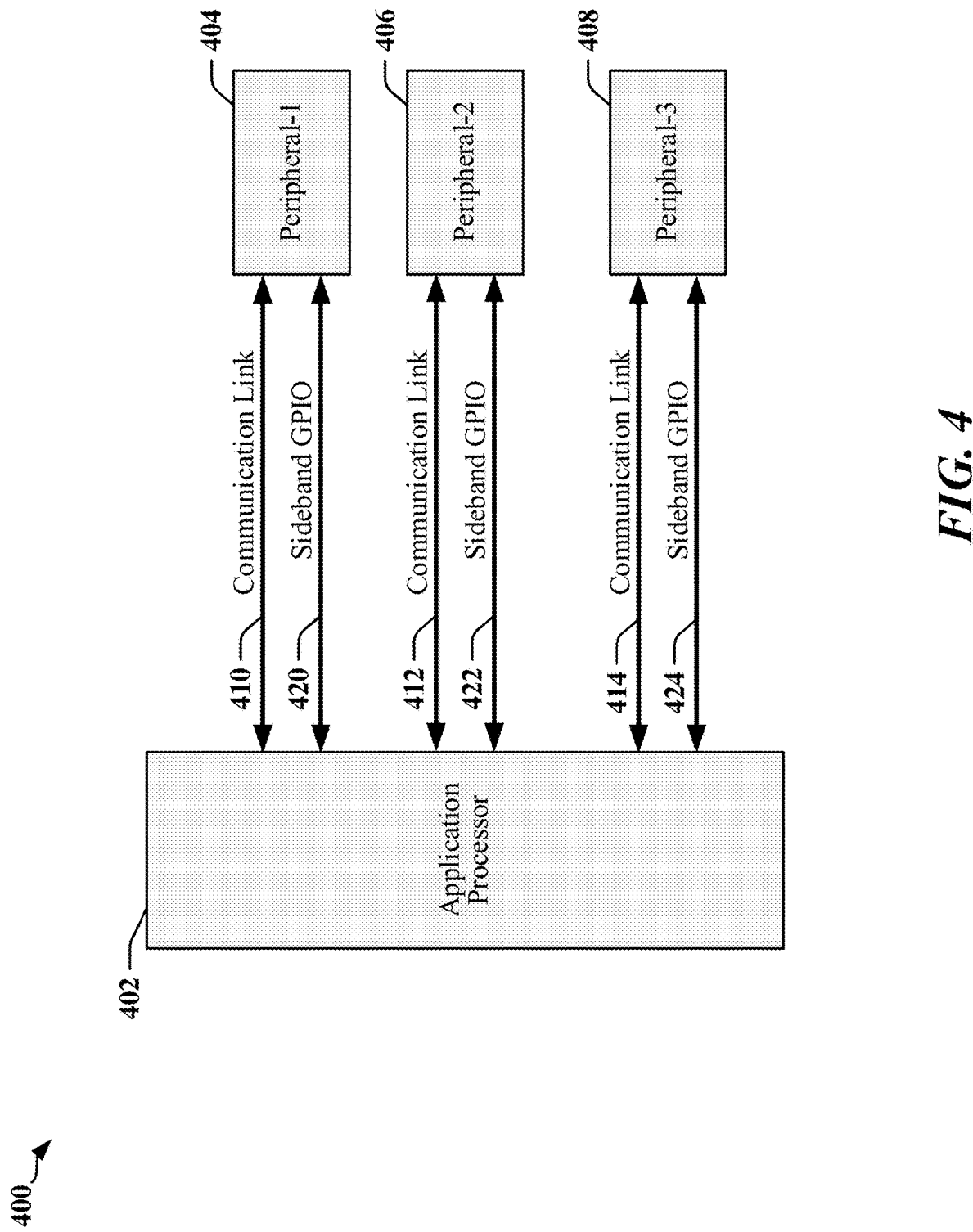
FIG. 4 illustrates an apparatus that includes an Application Processor and multiple peripheral devices that may be adapted according to certain aspects disclosed herein.

FIG. 4 illustrates an apparatus 400 that includes an Application Processor 402 and multiple peripheral devices 404, 406, 408. In the example, each peripheral device 404, 406, 408 communicates with the Application Processor 402 over a respective communication link 410, 412, 414 that may be operated independently and/or in accordance with mutually different protocols. Communication between the Application Processor 402 and each peripheral device 404, 406, 408 may involve additional wires that carry control or command signals between the Application Processor 402 and the peripheral devices 404, 406, 408. These additional wires may be referred to as sideband general purpose input/output (sideband GPIO 420, 422, 424), and in some instances the number of connections needed for sideband GPIO 420, 422, 424 can exceed the number of connections used for the corresponding communication link 410, 412, 414 and/or the number of physical GPIO pins available on an integrated circuit device for external connections.

The term GPIO pin or GPIO terminal may be used herein to refer to generic pins, connectors, pads, or terminals that may be used to interconnect circuits or devices. GPIO pins and GPIO connections may be customized for particular applications. For example, a GPIO pin may be programmable to function as an output pin, an input pin or a bidirectional pin, in accordance with application needs. In one example, the Application Processor 402 may assign and/or configure a number of GPIO pins to conduct handshake signaling or inter-processor communication (IPC) with a peripheral device 404, 406, 408 such as a modem. When handshake signaling is used, sideband signaling may be symmetric, where signaling is transmitted and received by the Application Processor 402 and a peripheral device 404, 406, 408. With increased device complexity, the increased number of GPIO pins used for IPC purposes may significantly increase manufacturing cost and limit GPIO availability for other system-level peripheral interfaces.

According to certain aspects of this disclosure, the state of GPIO, including GPIO associated with a communication link, may be virtualized by capturing and numerically representing the signaling state of the GPIO. Virtualized GPIO may be combined, serialized and transmitted over a data communication link. In one example, virtualized GPIO may be transmitted in packets over an I3C bus, RFFE bus, SPMI bus or other bus, using a command and control protocol to indicate packet content and/or destination. A receiver of the virtualized GPIO may deserialize a transmission received from the data communication link, and may provide a message, event to a processing circuit or drive physical GPIO in accordance with the virtualized GPIO.

Figure 5:
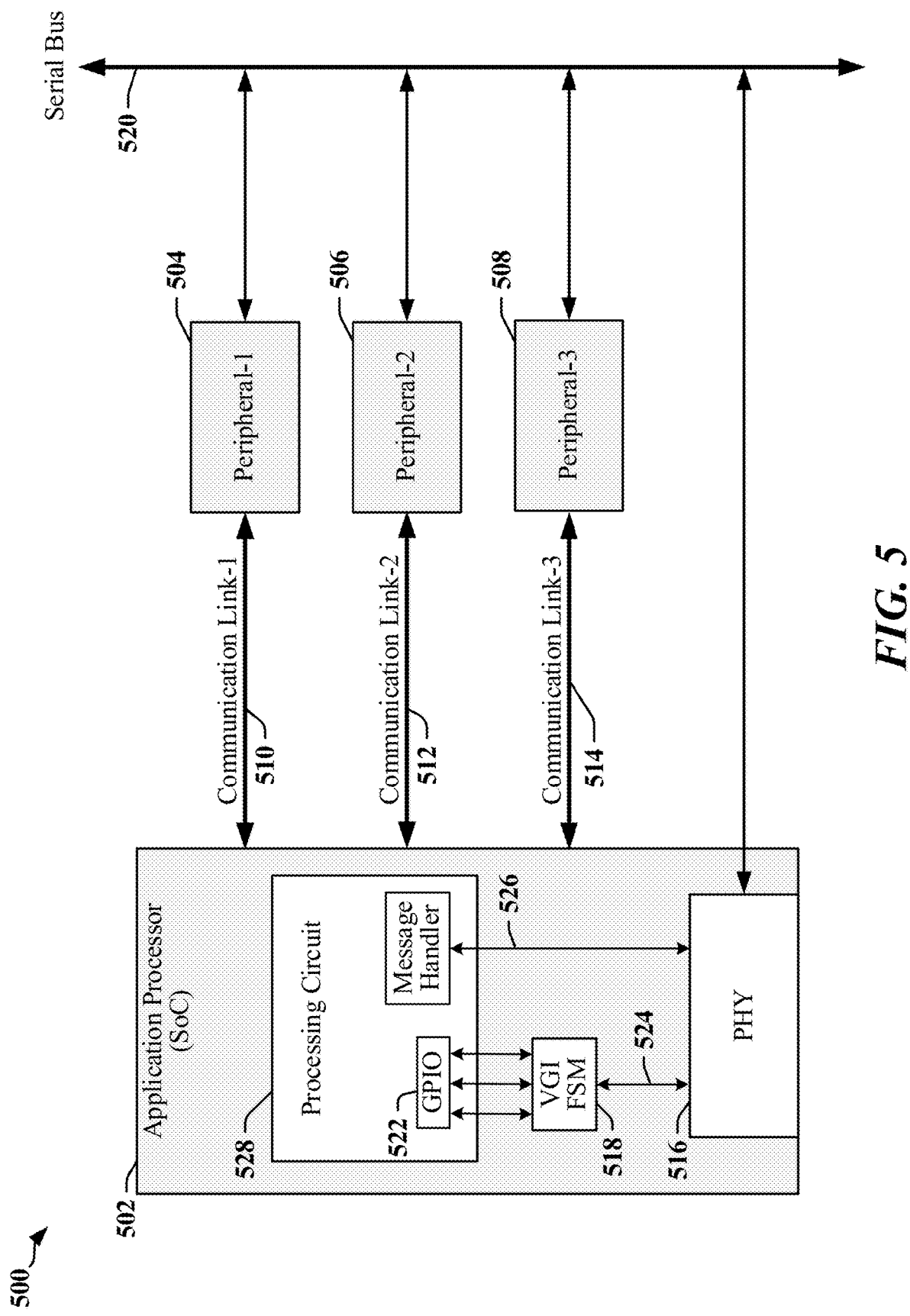
FIG. 5 illustrates a first example of an apparatus that has been adapted to support Virtual GPIO (VGI) in accordance with certain aspects disclosed herein.

FIG. 5 illustrates an apparatus 500 that has been adapted to provide a virtual GPIO interface (VGI) in accordance with certain aspects disclosed herein. The VGI enables the state of a plurality of GPIO pins 522 to be represented in bits of virtual GPIO state information that can be serialized and transmitted over a communication link. VGI messaging techniques disclosed herein can reduce the number of physical pins and connections used to connect an Application Processor 502 with one or more peripheral devices 504, 506, 508. In some examples, the Application Processor 502 is implemented in an SoC or other integrated circuit, while peripheral devices 504, 506, 508 may be collocated with the Application Processor 502 and/or implemented in one or more other SoCs or integrated circuit devices. In one example, an integrated circuit may include multiple modems that share RF transceivers provided in the integrated circuit. The peripheral devices 504, 506, 508 may communicate with the Application Processor 502 over a common shared bus or over individual, distinct communication links 510, 512, 514.

In the illustrated apparatus 500, the communication links 510, 512, 514 may correspond to the communication links 410, 412, 414 illustrated in FIG. 4, with physical GPIO pins 522 (e.g., the sideband GPIO 420, 422, 424) being virtualized in VGI messages that are encoded in packets by a finite state machine (FSM 518) for transmission over a serial bus 520. The signaling state of multiple physical GPIO pins 522 of a processing circuit 528 may be captured and numerically represented using one or more binary bits. Physical layer circuits and modules (PHY 516) responsible for transmitting packets over the serial bus 520 may combine and prioritize packetized application messages 526 and packetized VGI messages 524 for transmission over the serial bus 520. In some implementations, the FSM 518 may combine and prioritize the packetized application messages 526 and packetized VGI messages 524.

Figure 6:
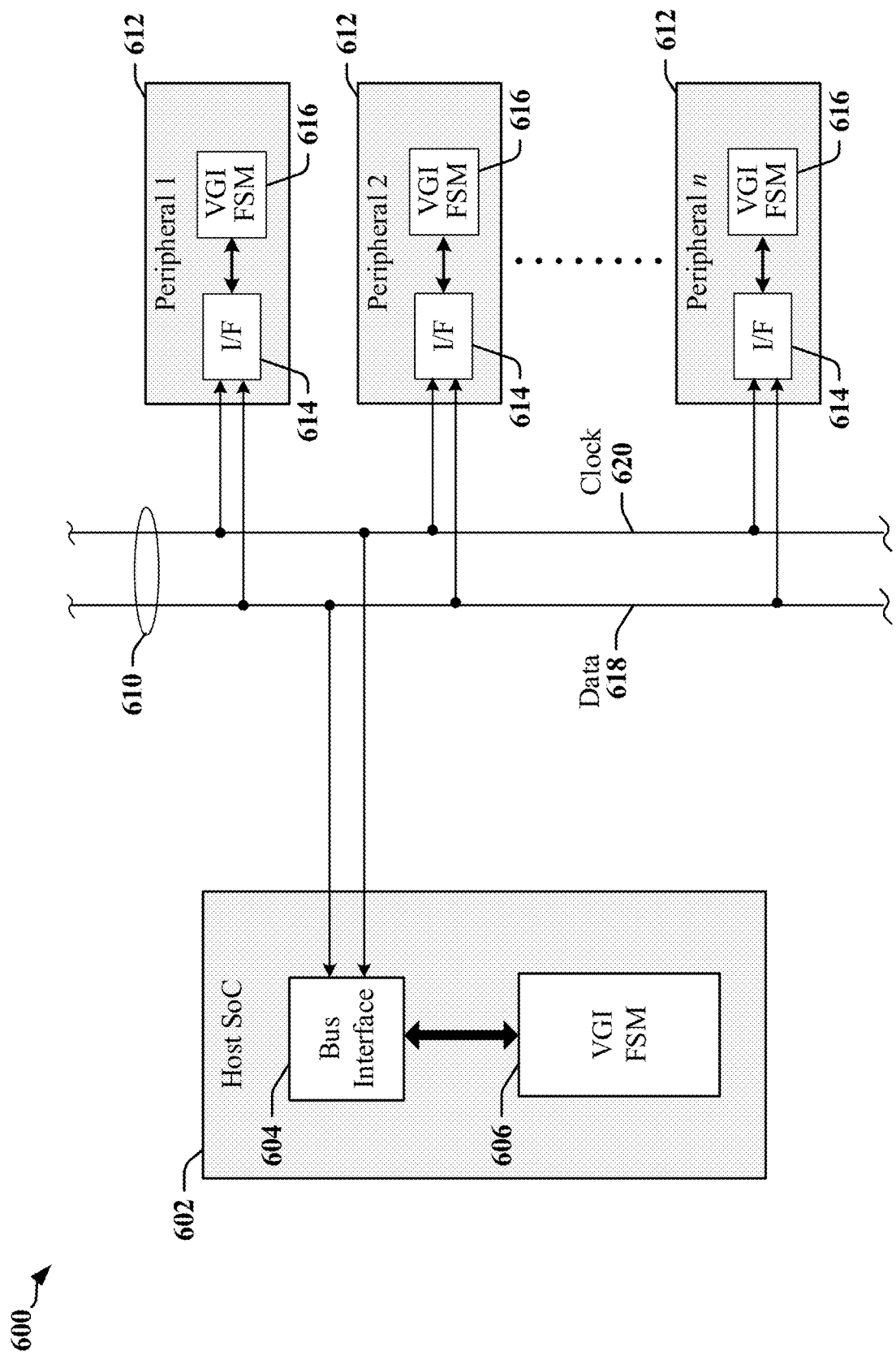
FIG. 6 illustrates a device that employs an I3C bus to couple various front-end devices in accordance with certain aspects disclosed herein.

FIG. 6 illustrates a configuration of a system 600 that enables the exchange of VGI messages between various devices over a serial bus 610 that has a data line 618 and a clock line 620. The system 600 includes a host SoC 602 and a number of peripheral devices 612. It will be appreciated that certain concepts disclosed herein apply equally to communication links operated in accordance with other protocols, such as I2C, I3C, RFFE and SPMI protocols. The host SoC 602 may include a VGI finite state machine (VGI FSM 606) and a bus interface 604. The bus interface 604 cooperates with corresponding bus interfaces 614 in the peripheral devices 612 in accordance with a bus protocol to provide a communication link between the host SoC 602 and the peripheral devices 612. Each peripheral device 612 includes a VGI FSM 616. In some examples, the host SoC 602 may include a configurable interface that may be employed to communicate using some combination of I2C, I3C, RFFE and/or another suitable protocol.

Figure 7:
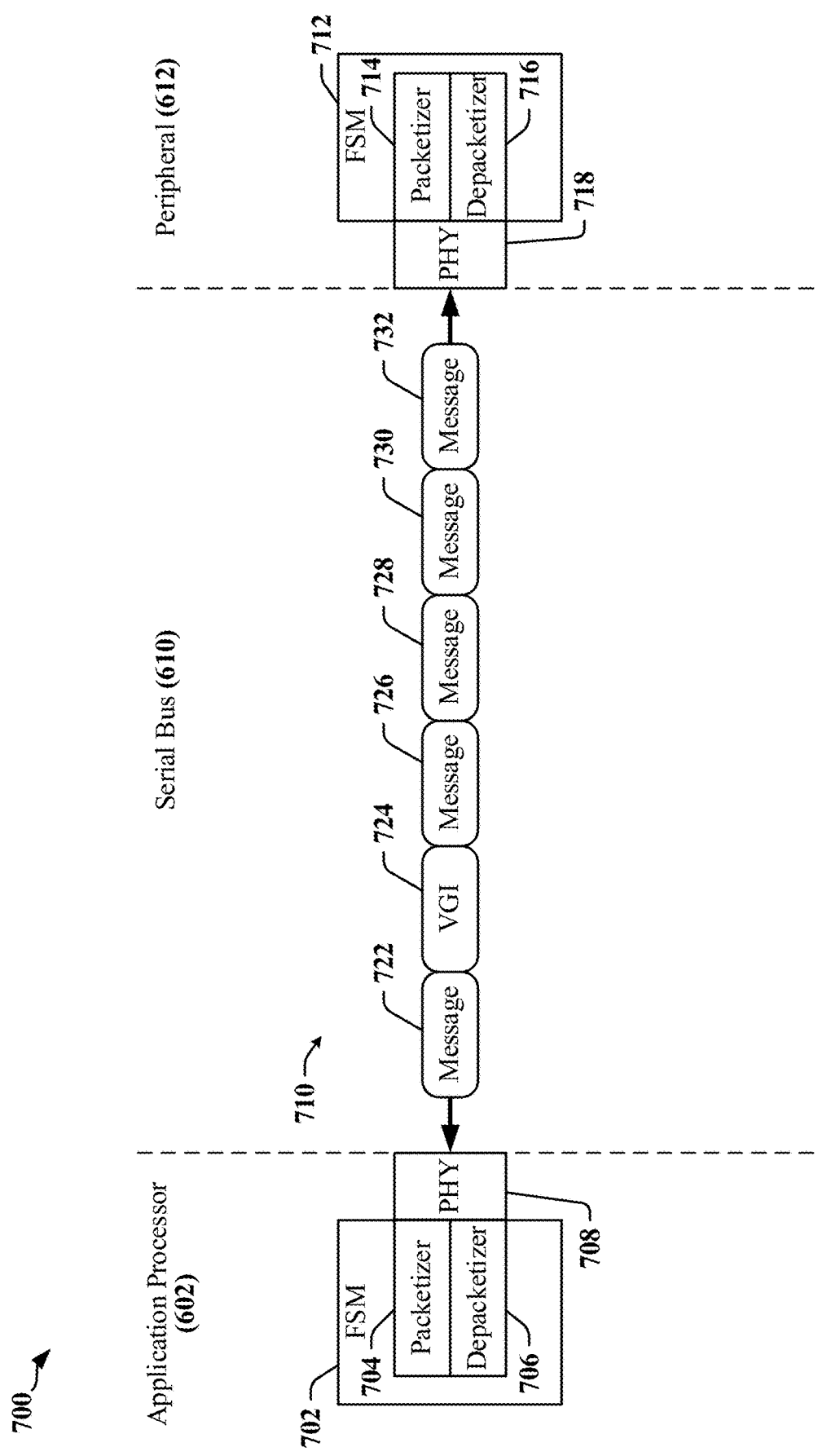
FIG. 7 illustrates a system in which VGI is transmitted in a packet stream in accordance with certain aspects disclosed herein.

FIG. 7 illustrates a system 700 in which a VGI message is packetized in one or more VGI packets 724 and transmitted in a packet stream 710 that includes messages 722, 726, 728, 730, 732 that carry messages associated with one or more applications supported by the host SoC 602. The VGI packet 724 and one or more of the messages 722, 726, 728, 730, 732 in the packet stream 710 may be exchanged over the serial bus 610 and between the host SoC 602 and at least one peripheral device 612.

A finite state machine 702 in the host SoC 602 may include a packetizer 704 configured to generate VGI packets 724 that are transmitted through a physical layer interface, the PHY 708. In some examples, the finite state machine 702 may prioritize VGI packets 724 over one or more of the messages 722, 726, 728, 730, 732 that include application or control information to be transmitted over the serial bus 610. The finite state machine 702 may insert the VGI packets 724 into a stream of messages 722, 726, 728, 730, 732 for transmission over the serial bus 610. The finite state machine 702 may receive the VGI packet 724 and one or more of the messages 722, 726, 728, 730, 732 through the PHY 708. The finite state machine 702 may pass received messages 722, 726, 728, 730 and/or 732 to other functions and/or circuits in the host SoC 602. The finite state machine 702 may include a depacketizer 706 that decodes virtualized GPIO state information in received VGI packets 724 and may drive physical signals and/or physical GPIO pins in accordance with the GPIO state information.

A finite state machine 712 in the peripheral device 612 may include a packetizer 714 configured to generate VGI packets 724 that are to be transmitted by the PHY 718. In some examples, the finite state machine 712 may prioritize VGI packets 724 for transmission on the serial bus 610. The finite state machine 712 may insert the VGI packets 724 into a stream of messages 722, 726, 728, 730, 732. The finite state machine 712 may receive the VGI packet 724 and one or more of the messages 722, 726, 728, 730, 732 through the PHY 718. The finite state machine 712 may pass received messages 722, 726, 728, 730, 732 to other functions and/or circuits in the peripheral device 612. The finite state machine 712 may include a depacketizer 716 that decodes virtualized GPIO state information in received VGI packets 724 and may drive physical signals and/or physical GPIO pins in accordance with the GPIO state information.

The exchange of VGI packets 724 enables a physical GPIO pin in the host SoC 602 to track and replicate the signaling state of a corresponding physical GPIO pin in the peripheral device 612, and enables a physical GPIO pin in the peripheral device 612 to track and replicate the signaling state of a corresponding physical GPIO pin in the host SoC 602.

Figure 8:
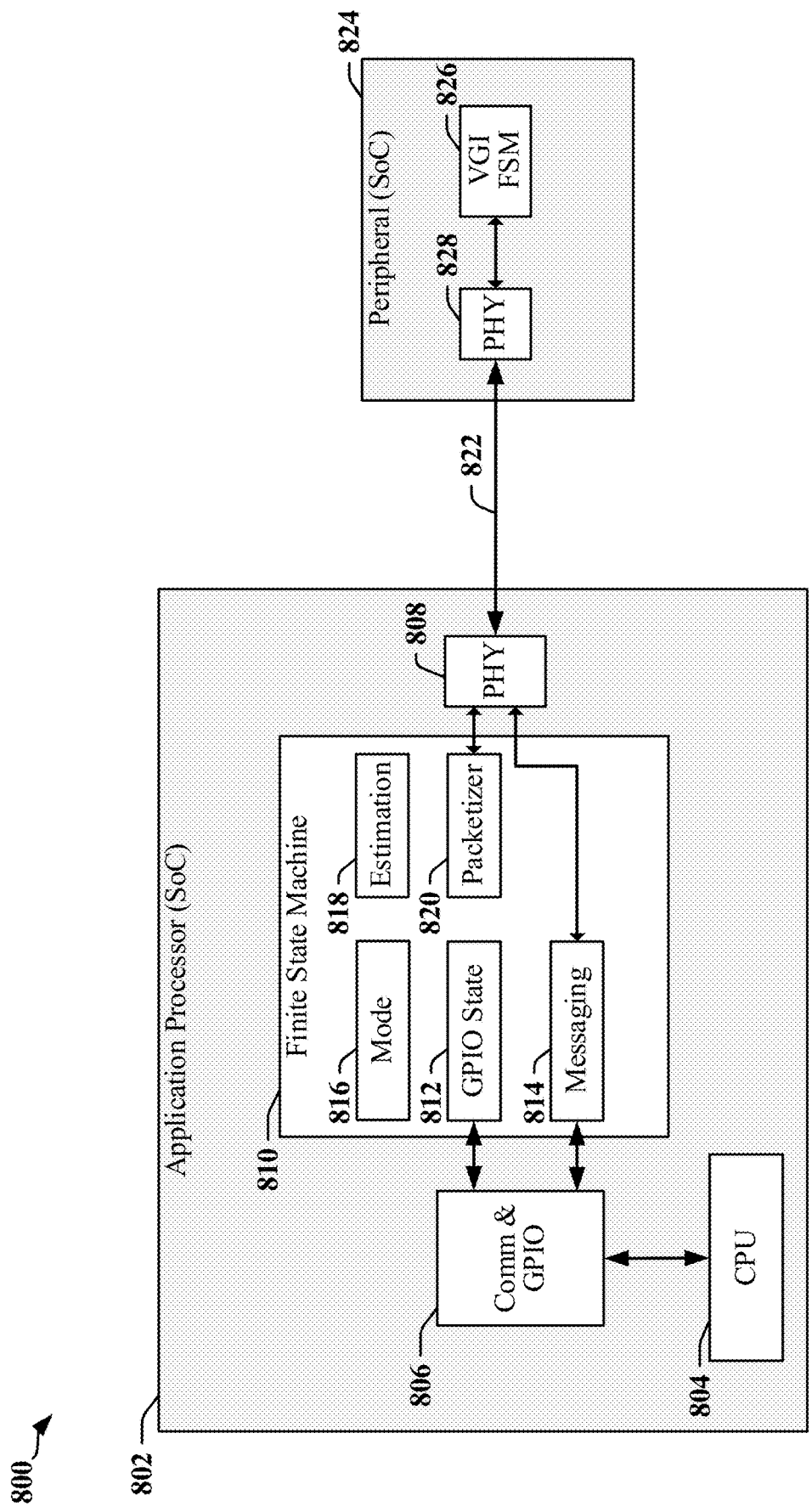
FIG. 8 illustrates a second example of an apparatus that has been adapted to support Virtual GPIO in accordance with certain aspects disclosed herein.

FIG. 8 illustrates an apparatus 800 that is adapted to support the exchange of VGI messages between an Application Processor 802 and a peripheral device 824 in accordance with certain aspects disclosed herein. The signaling state of physical GPIO, changes in signaling state of physical GPIO, and/or signals transmitted through physical GPIO can be represented in bits of virtual GPIO information that may be provided in VGI messages, serialized, and transmitted over a communication link 822. In one example, the signaling state of physical GPIO represented in bits of virtual GPIO information may correspond to a voltage level observed or expected at a physical GPIO pin. In some implementations, signals transmitted through pins, traces, connectors wires, etc. (GPIO signals), may be represented as a time sequence of virtual state information transmitted in VGI messages. For example, virtual state information for a GPIO pin may be represented by a binary bit where a bit value of '0' represents a '0' level or logic state, and a bit value of '1' represents a '1' level or logic state. In some implementations, signals transmitted through pins, traces, connectors wires, etc. (GPIO signals), may be communicated as a sequence of virtual state changes and transmitted in VGI messages. In one example, state changes may be represented by a binary bit where a bit value of '0' a positive transition or change in state from a '0' level to a '1' level, and a bit value of '1' represents a negative transition or change in state from a '1' level to a '0' level. In another example, state changes may be represented by a binary bit where a bit value of '0' represents no change of level or logic state, and a bit value of '1' represents a change of change of level or logic state. Other examples and assignments of values may be implemented as desired, and the number of bits used to represent GPIO state or change of state may vary with application.

In some instances, VGI messages are transmitted after a change in physical GPIO state has occurred. In one example, VGI messages may be encoded in packets that are transmitted over a communication link 822 that is implemented using a serial bus. When the communication link 822 is implemented using a serial bus, the receiving peripheral device 824 may deserialize received packets and may extract VGI messages and, in some instances, application messages or control messages from the received packets. A VGI FSM 826 in the peripheral device 824 may convert the VGI messages to physical GPIO state, change in state and/or signals that can be presented at an internal GPIO interface.

In another example, the communication link 822 may be provided by a radio frequency transceiver that supports wireless communication using, for example, a Bluetooth protocol, a wireless local area network (WLAN) protocol, a cellular wide area network, and/or another wireless communication protocol. When the communication link 822 includes a wireless connection, application messages, control messages and/or VGI messages may be encoded in packets, frames, subframes, or other structures that can be transmitted over the communication link 822, and the receiving peripheral device 824 may extract, deserialize and otherwise process received signaling to obtain the application messages, control messages or VGI messages. Upon receipt of application messages, control messages or VGI messages, the VGI FSM 826 or another component of the receiving device may interrupt its host processor to indicate receipt of application messages, control messages, GPIO state or changes in GPIO state.

In an example in which the communication link 822 is provided as a serial bus, application messages, control messages or VGI messages may be transmitted in packets configured according to an I2C, I3C, RFFE, SPMI protocol or the like. In the illustrated example, VGI messages may be exchanged to accommodate I/O bridging between an Application Processor 802 and a peripheral device 824. The Application Processor 802 may be implemented as an ASIC, SoC or some combination of devices. The Application Processor 802 includes a processor (central processing unit or CPU 804) that generates messages and GPIO associated with one or more communications channels 806. The application messages, control messages and/or VGI messages transmitted over the communications channels 806 may be monitored by respective monitoring circuits 812, 814 in a VGI FSM 826. In some examples, a GPIO monitoring circuit 812 or other circuit may be adapted to produce VGI messages representative of the state of physical GPIO signals. In some examples, the GPIO monitoring circuit 812 or other circuit may be adapted to produce application messages, control messages or VGI messages responsive to changes in the state of the physical GPIO signals.

An estimation circuit 818 may be configured to estimate latency information for the GPIO signals and application messages or control messages, and may select a protocol, and/or a mode of communication for the communication link 822 that optimizes the latency for encoding and transmitting application messages, control messages or VGI messages. The estimation circuit 818 may maintain protocol and mode information 816 that characterizes certain aspects of the communication link 822 to be considered when selecting the protocol, and/or a mode of communication. The estimation circuit 818 may be further configured to select a packet type for encoding and transmitting the application messages, control messages or VGI messages. The estimation circuit 818 may provide configuration information used by a packetizer 820 to encode the application messages, control messages or VGI messages. In one example, the configuration information is provided as a command that may be encapsulated in a packet such that the type of packet can be determined at a receiver. The configuration information, which may be a command, may also be provided to physical layer circuits (PHY 808). The PHY 808 may use the configuration information to select a protocol and/or mode of communication for transmitting the associated packet. The PHY 808 may then generate the appropriate signaling to transmit the packet.

The peripheral device 824 may include a VGI FSM 826 that may be configured to process data packets received from the communication link 822. The VGI FSM 826 at the peripheral device 824 may extract messages and may map bit positions in VGI messages onto physical GPIO pins in the peripheral device 824. In certain embodiments, the communication link 822 is bidirectional, and both the Application Processor 802 and a peripheral device 824 may operate as both transmitter and receiver.

Application messages, control messages and/or VGI messages may be encapsulated into packets transmitted over the communication link 822, which may be a multi-wire serial bus or multi-wire parallel bus for example. The PHY 808 in the Application Processor 802 and a corresponding PHY 828 in the peripheral device 824 may be configured to establish and operate the communication link 822. The PHY 808 and 828 may be coupled to, or include a wireless transceiver 108 (see FIG. 1) that supports wireless communications. In some examples, the PHY 808 and 828 may be configured to provide a two-wire interface at the Application Processor 802 and peripheral device 824, respectively, where the two-wire interface is compatible with I2C, I3C, RFFE, SPMI or other protocols.

VGI tunneling, as disclosed herein, can be implemented using existing or available protocols configured for operating the communication link 822, and without the full complement of physical GPIO pins. VGI FSMs 810, 826 may handle GPIO signaling without the intervention of a processor in the Application Processor 802 and/or in the peripheral device 824. The use of VGI tunneling can reduce pin count, power consumption, and latency associated with the communication link 822.

At the receiving device VGI messages are converted into physical GPIO signals. Certain characteristics of the physical GPIO pins may be configured using the VGI messages. For example, slew rate, polarity, drive strength, and other related parameters and attributes of the physical GPIO pins may be configured using the VGI messages. Configuration parameters used to configure the physical GPIO pins may be stored in configuration registers associated with corresponding GPIO pins. These configuration parameters can be addressed using a proprietary or conventional protocol such as I2C, I3C or RFFE. In one example, configuration parameters may be maintained in I3C addressable registers. Certain aspects disclosed herein relate to reducing latencies associated with the transmission of configuration parameters and corresponding addresses (e.g., addresses of registers used to store configuration parameters).

A communication interface adapted to communicate VGI messages in packets and/or as a sequence of transactions over an I2C, I3C, RFFE or SPMI serial bus may be referred to herein as a VGI messaging interface or VGMI. The presence of a VGI message in a transaction, packet or frame may be signaled using a special command code to identify the frame as a VGI frame. In some implementations, a serial data stream may be transmitted in a form that resembles a universal asynchronous receiver/transmitter (UART) signaling and messaging protocol, in what may be referred to herein as UART_VGI mode of operation.

Figure 9:
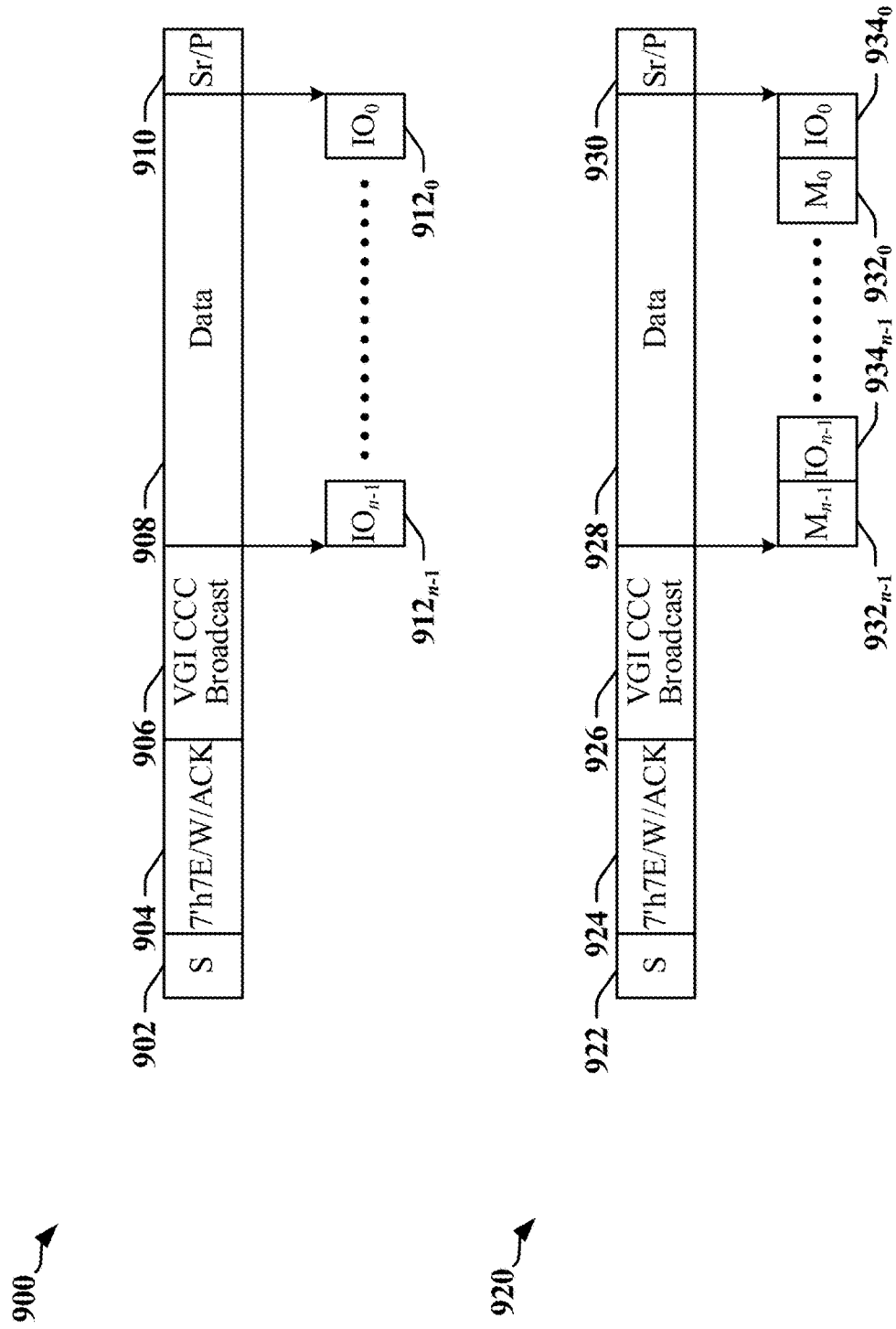
FIG. 9 illustrates examples of VGI broadcast frames according to certain aspects disclosed herein.

FIG. 9 illustrates examples of VGI broadcast frames 900, 920. In a first example, a VGI broadcast frame 900 commences with a start bit 902 (S) followed by a header 904 in accordance with an I2C or I3C protocol. A VGI broadcast frame may be identified using a VGI broadcast common command code 906. A VGI data payload 908 includes a number (n) of VGI messages $912_0$-$912_{n-1}$, ranging from a first VGI message $912_0$ to an nth VGI message $912_{n-1}$. A VGI FSM may include a mapping table that maps bit positions of VGI messages in a VGI data payload 908 to physical GPIO pins. The virtual nature of the signaling in the VGI data payload 908 can be transparent to processors in the transmitting and receiving devices.

In the second example, a masked VGI broadcast frame 920 may be transmitted by a host device to write the state of one or more GPIO pins without disturbing the state of other GPIO pins. In this example, the I/O signals for one or more devices are masked, while the I/O signals in a targeted device are unmasked. The masked VGI broadcast frame 920 commences with a start bit 922 followed by a header 924. A masked VGI broadcast frame 920 may be identified using a masked VGI broadcast common command code 926. The VGI data payload 928 may include I/O signal values $934_0$-$934_{n-1}$ and corresponding mask bits $932_0$-$932_{n-1}$, ranging from a first mask bit $M_0$ $932_0$ for the first I/O signal ($IO_0$) to an nth mask bit $M_{n-1}$ $932_{n-1}$ for the nth I/O signal $IO_{n-1}$.

A stop bit or synchronization bit (Sr/P 910, 930) terminates the VGI broadcast frame 900, 920. A synchronization bit may be transmitted to indicate that an additional VGI payload is to be transmitted. In one example, the synchronization bit may be a repeated START bit in an I2C interface.

Figure 10:
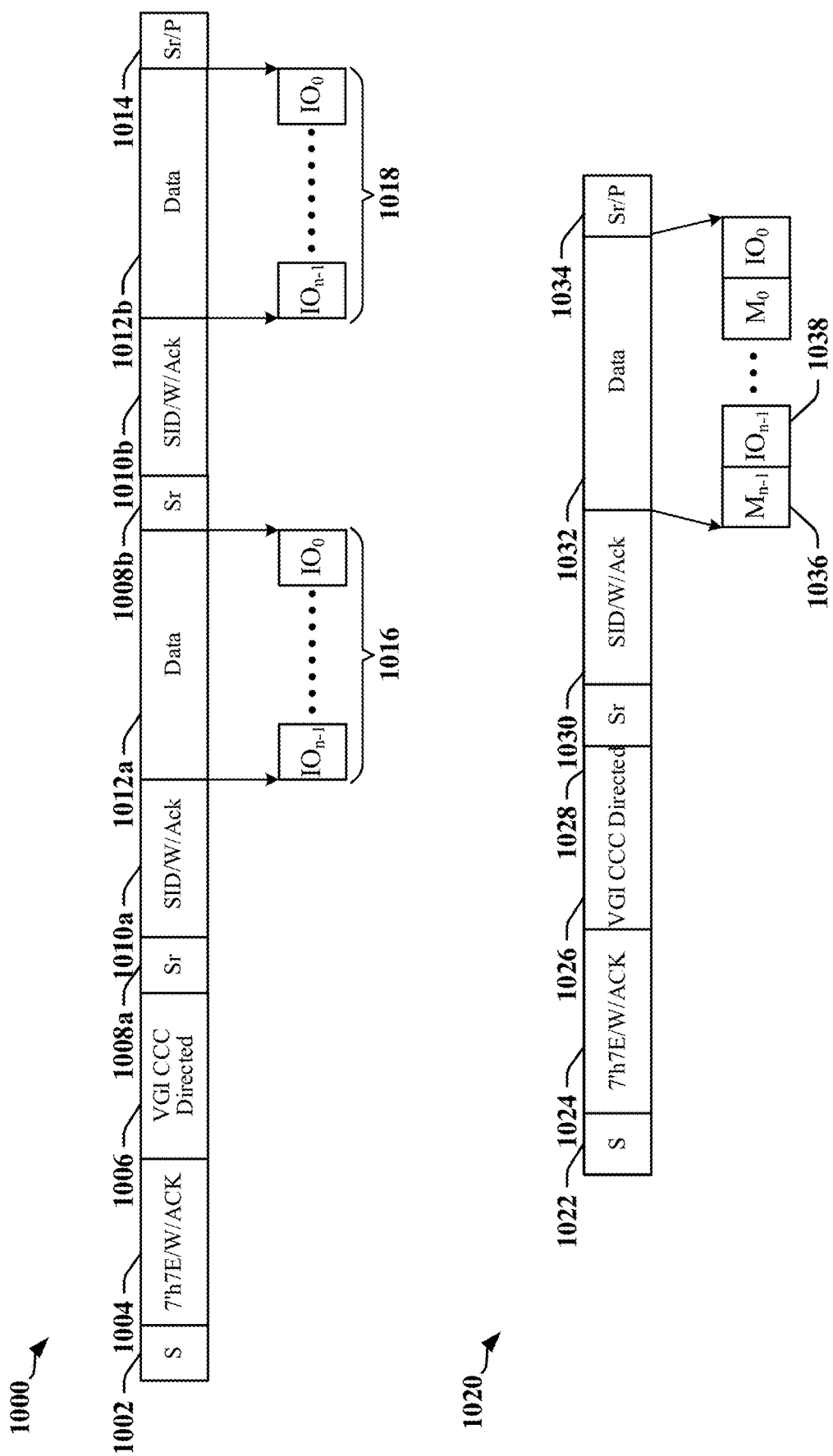
FIG. 10 illustrates examples of directed VGI frames according to certain aspects disclosed herein.

FIG. 10 illustrates examples of directed VGI frames 1000, 1020. In a first example, directed VGI frames 1000 may be addressed to a single peripheral device or, in some instances, to a group of peripheral devices. The first of the directed VGI frames 1000 commences with a start bit 1002 (S) followed by a header 1004 in accordance with an I2C or I3C protocol. A directed VGI frame 1000 may be identified using a VGI directed common command code 1006. The directed common command code 1006 may be followed by a synchronization field 1008a (Sr) and an address field 1010a that includes a slave identifier to select the addressed device. The directed VGI data payload 1012a that follows the address field 1010a includes values 1016 for a set of I/O signals that pertain to the addressed device. directed VGI frames 1000 can include additional directed VGI data payloads 1012b for additional devices. For example, the first directed VGI data payload 1012a may be followed by a synchronization field 1008b and a second address field 1010b. In this example, the second directed VGI data payload 1012b includes values 1018 for a set of I/O signals that pertain to a second addressed device. The use of directed VGI frames 1000 may permit transmission of values for a subset or portion of the I/O signals carried in a VGI broadcast frame 900, 920.

In the second example, a masked directed VGI frame 1020 may be transmitted by a host device to write the state of one or more GPIO pins without disturbing the state of other GPIO pins in a single peripheral device and without affecting other peripheral devices. In some examples, the I/O signals in one or more devices may be masked, while selected I/O signals in one or more targeted device are unmasked. The masked directed VGI frame 1020 commences with a start bit 1022 followed by a header 1024. A masked directed VGI frame 1020 may be identified using a masked VGI directed command code 1026. The masked VGI directed command code 1026 may be followed by a synchronization field 1028 (Sr) and an address field 1030 that includes a slave identifier to select the addressed device. The directed payload 1032 that follows includes VGI values for a set of I/O signals that pertain to the addressed device. For example, the VGI values in the directed payload 1032 may include I/O signal values 1038 and corresponding mask bits 1036.

A stop bit or synchronization bit (Sr/P 1014, 1034) terminates the directed VGI frames 1000, 1020. A synchronization bit may be transmitted to indicate that an additional VGI payload is to be transmitted. In one example, the synchronization bit may be a repeated START bit in an I2C interface.

Figure 11:
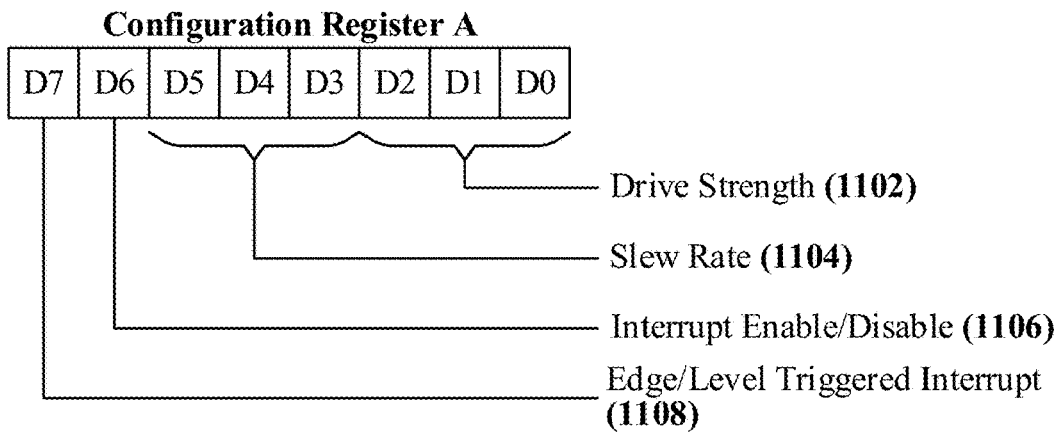
FIG. 11 illustrates configuration registers that may be associated with a physical pin according to certain aspects disclosed herein.
Figure 11:
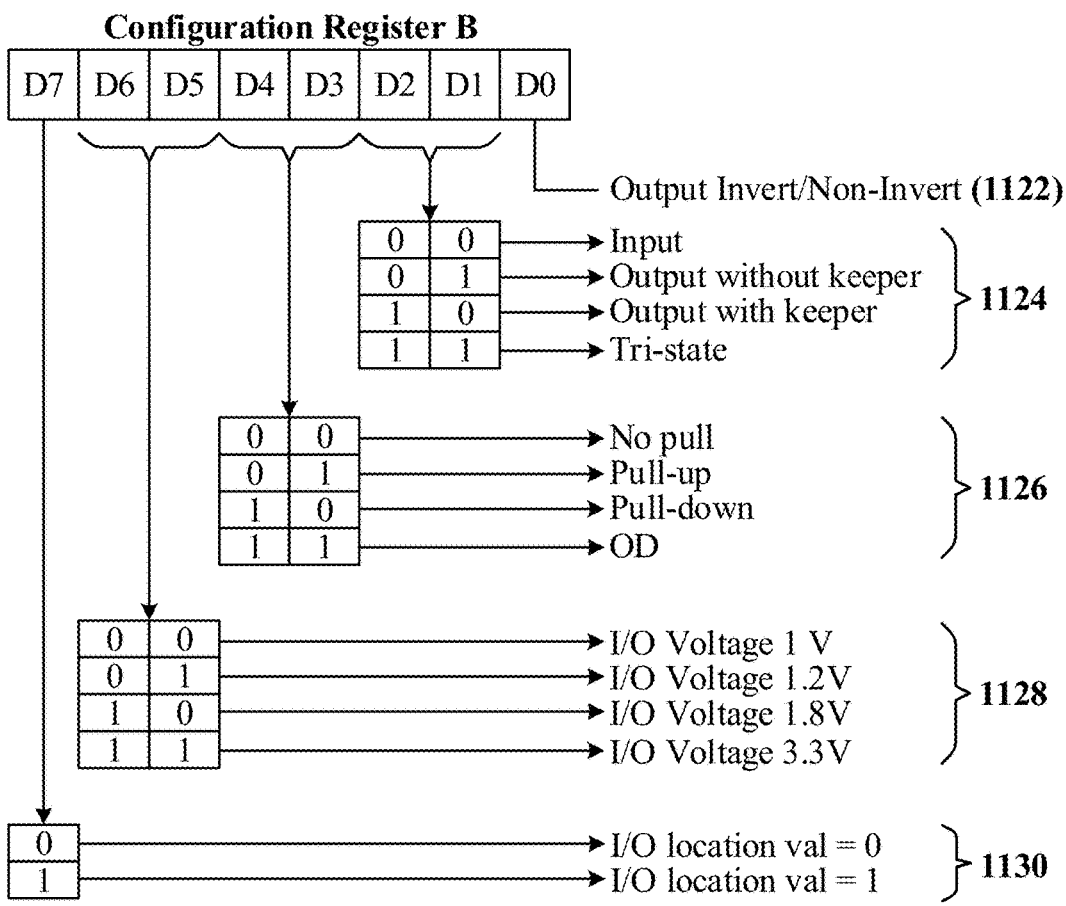

At the receiving device (e.g., the Application Processor 502 or the peripheral device 504, 506, 508), received VGI messages are expanded into physical GPIO signal states presented on GPIO pins. The term "pin," as used herein, may refer to a physical structure such as a pad, pin or other interconnecting element used to couple an IC to a wire, trace, through-hole via, or other suitable physical connector provided on a circuit board, substrate or the like. Each GPIO pin may be associated with one or more configuration registers that store configuration parameters for the GPIO pin. FIG. 11 illustrates examples of configuration registers 1100 and 1120 that may be associated with a physical pin. Each configuration register 1100, 1120 is implemented as a one-byte (8 bits) register, where different bits or groups of bits define a characteristic or other features that can be controlled through configuration. In a first example, bits D0-D2 1102 control the drive strength for the GPIO pin, bits D3-D5 1104 control the slew rate for GPIO pin, bit D6 1106 enables interrupts, and bit D7 1108 determines whether interrupts are edge-triggered or triggered by voltage-level. In a second example, bit D0 1122 selects whether the GPIO pin receives an inverted or non-inverted signal, bits D1-D2 1124 define a type of input or output pin, bits D3-D4 1126 defines certain characteristics of an undriven pin, bits D5-D6 1128 define voltage levels for signaling states, and bit D7 1130 controls the binary value for the GPIO pin (i.e., whether GPIO pin carries carry a binary one or zero).

Heterogeneous VGI

In an interface that employs VGI messages to exchange GPIO state information between devices, a physical GPIO pin in a first device can track and replicate the signaling state of a corresponding physical GPIO pin in a second device, and vice versa. The VGI messages may be exchanged over a serial bus or other communication link that carries other messages, including application messages or control messages transmitted to or between devices, peripherals and/or applications. The application messages may include payload data generated by sensors or state information related to an application executed by a processing circuit, or generated by the application. The other messages may include management and control messages, including events generated by applications, device drivers and other software. The events may include software interrupts, traps, changes in status of flags or semaphores and other inter-process messages. Management and control messages may be transmitted in high-priority application packets, and a VGI finite state machine may be configured to arbitrate between packets carrying VGI messages, high-priority application messages, management and control messages.

According to certain aspects disclosed herein, software events may be handled by a finite state machine that is adapted to generate VGI packets representative of physical GPIO state information. Software events and certain management and control messages may be represented in the same manner that physical GPIO is represented. In one example, software events may be represented in the same manner that physical GPIO is represented when the physical GPIO represents signaling states associated with hardware events. In some implementations, software events may be converted to physical signals that can be handled by the VGI finite state machine with little or no adaptation of the VGI finite state machine. In some implementations, the software events may be converted to bit settings in registers configured to handle virtualized GPIO (see configuration registers 1100 and 1120 of FIG. 11).

Figure 12:
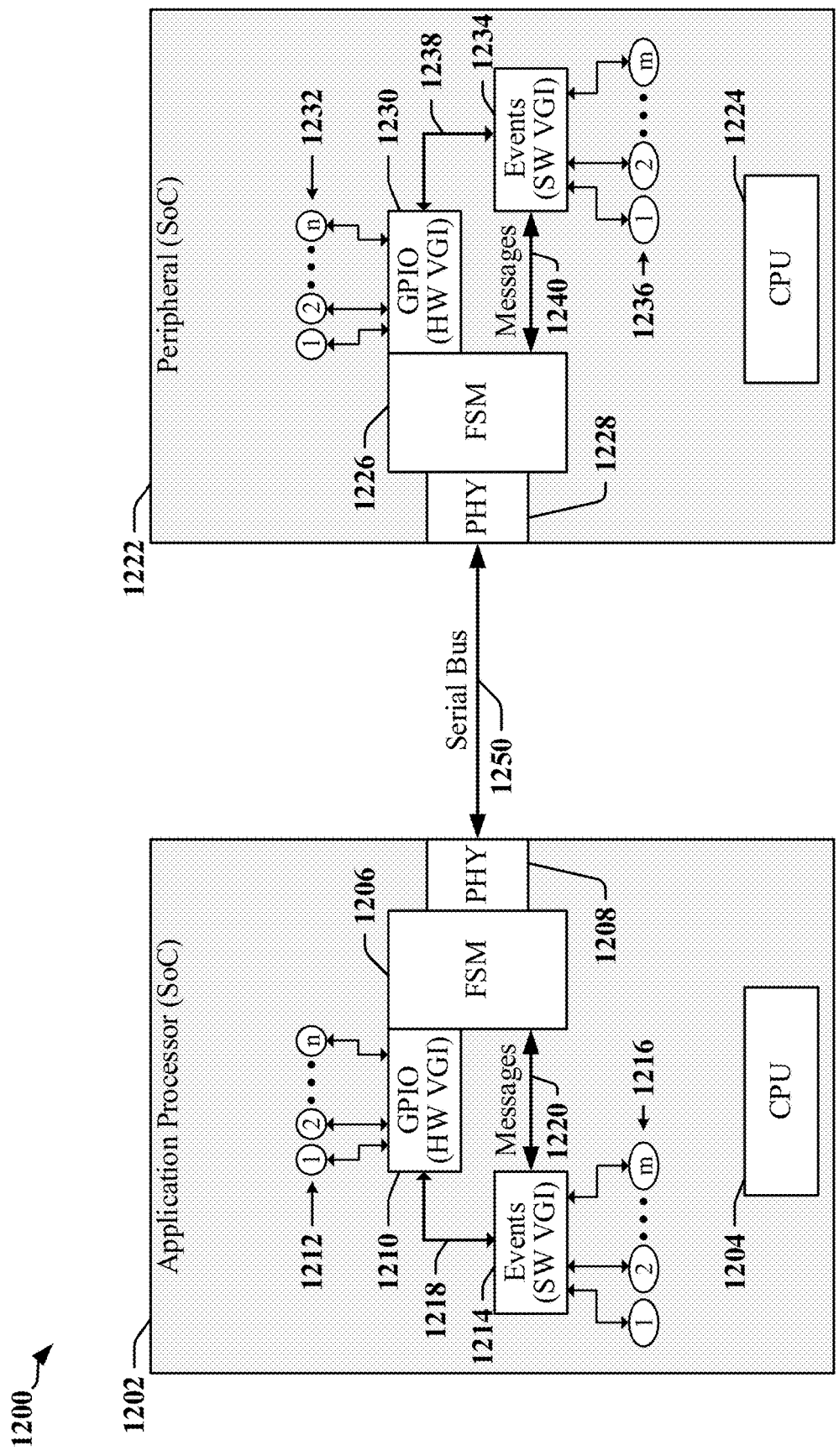
FIG. 12 illustrates an apparatus that is adapted to represent hardware and software events as VGI in accordance with certain aspects disclosed herein.

FIG. 12 illustrates an apparatus 1200 that is adapted to represent hardware and software events as virtual GPIO in accordance with certain aspects disclosed herein. Hardware events may be generated by changes in state of physical GPIO, while software events may be generated by applications or operating systems and communicated in a message, in a memory or register value or as a call to a function monitored by the operating system or an application.

In the illustrated apparatus 1200, an Application Processor 1202 includes a central processing unit (CPU 1204), finite state machine 1206 and PHY 1208. The PHY 1208 may handle transmission of packets that carry VGI messages over a serial bus 1250. The VGI messages are provided to the PHY 1208 by the finite state machine 1206. The finite state machine 1206 may be adapted to include hardware and software event handlers 1210, 1214. The GPIO handler 1210 may monitor physical GPIO 1212 as sources of hardware events. The physical GPIO 1212 may be virtualized as disclosed herein. In some instances, the GPIO handler 1210 may include information in the VGI messages that explicitly identifies included state information as being related to physical GPIO.

The software event handler 1214 may receive software event messages directly from one or more software event sources 1216. In some instances, the software event handler 1214 may receive or monitor a packet stream that includes other types of message. The software event handler 1214 may identify software events based on direct notification by an application, or by monitoring certain operations of the Application Processor 1202. In one example, an application that generates an event writes a register monitored by the software event handler 1214. The software event handler 1214 may provide and monitor physical signals 1218 that represent software events, and may translate between the physical signals 1218 and the software event sources 1216. The finite state machine 1206 may generate VGI messages to be transmitted to the peripheral device 1222. In some implementations, the software handler 1214 may encode software events in VGI messages 1220 provided to the finite state machine 1206. The software handler 1214 may include information in the VGI messages 1220 that identifies software events in the in the VGI messages 1220.

The finite state machine 1206 may also receive VGI messages from a peripheral device 1222 through the PHY 1208. The peripheral device 1222 may include a central processing unit (CPU 1224), finite state machine 1226 and PHY 1228. The PHY 1228 may handle transmission of packets that carry VGI messages over the serial bus 1250. The VGI messages are provided to the PHY 1228 by the finite state machine 1226. The finite state machine 1226 may be adapted to include hardware and software event handlers 1230, 1234. The GPIO handler 1230 may monitor physical GPIO 1232 as sources of hardware events. The physical GPIO 1232 may be virtualized as disclosed herein. In some instances, the GPIO handler 1230 may include information in the VGI messages that explicitly identifies included state information as being related to physical GPIO.

The software event handler 1234 may receive software event messages directly from one or more software event sources 1236. In some instances, the software event handler 1234 may receive or monitor a packet stream that includes other types of message. The software event handler 1234 may identify software events based on direct notification by an application, and/or by monitoring certain operations of the peripheral device 1222. In one example, an application that generates an event writes a register monitored by the software event handler 1234. The software handler 1234 may provide and monitor physical signals 1238 that represent software events, and may translate between the physical signals 1238 and the software event sources 1236. The finite state machine 1226 may generate VGI messages to be transmitted by the finite state machine 1226. In some implementations, the software handler 1234 may encode software events in VGI messages 1240 provided to the finite state machine 1226. The software handler 1234 may include information in the VGI messages 1240 that identifies software events in the in the VGI messages 1240.

In one example, the finite state machines 1206, 1226 may distinguish between VGI messages that relate to software events and VGI messages that relate to physical GPIO based on identifying information provided in the VGI messages. In another example, the finite state machines 1206, 1226 may direct VGI messages to a handler 1210, 1214, 1230 or 1234 identified in the VGI messages. In the latter example, the interface between the finite state machine 1206, 1226 and corresponding handlers 1210, 1214, 1230, 1234 can be abstracted such that the finite state machines 1206, 1226 need not be aware of the type of function of the handlers 1210, 1214, 1230, 1234. In either example, a VGI interface may be configured to support conversion between physical GPIO on a first device and software events on a second device, and vice versa.

Figure 13:
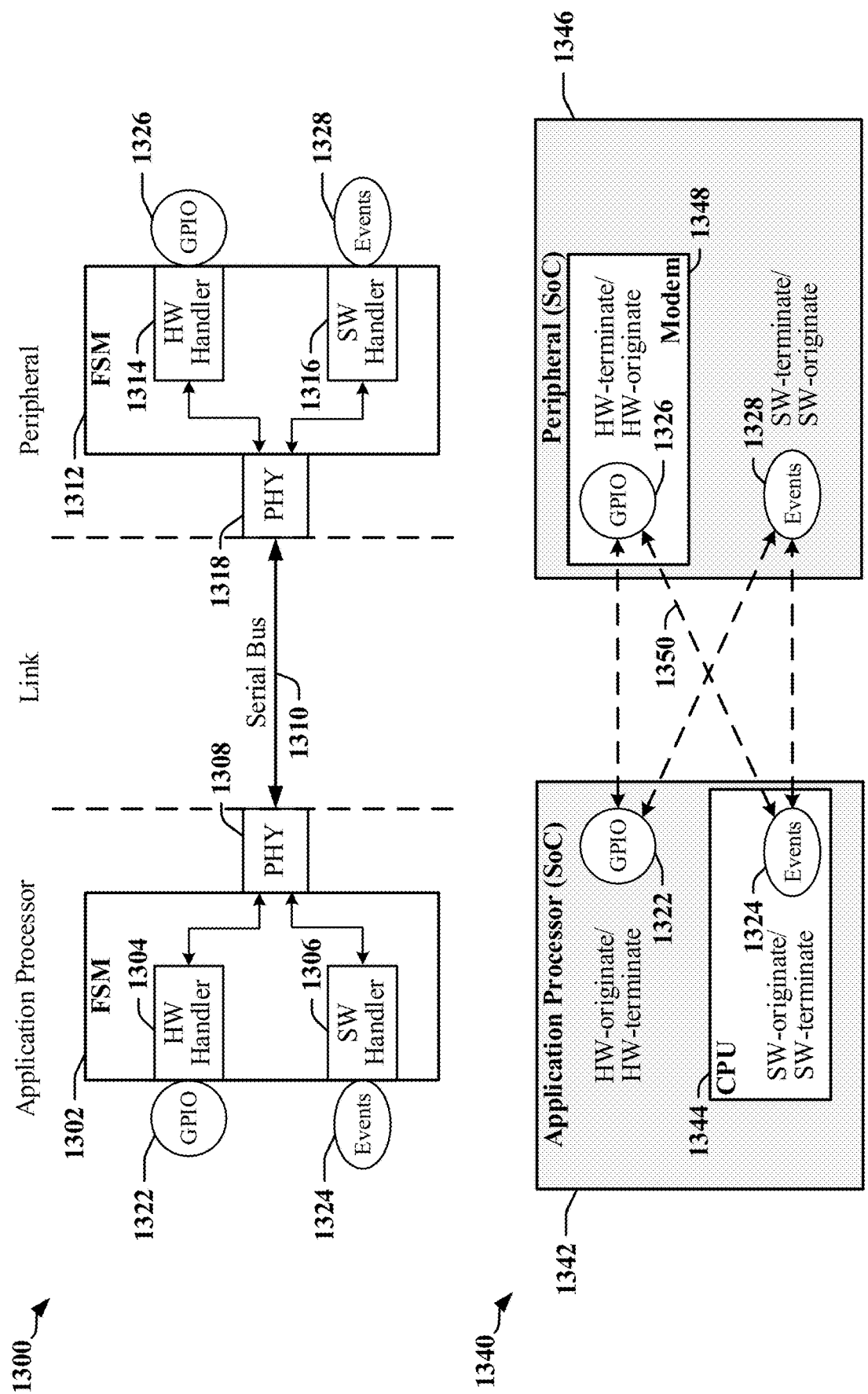
FIG. 13 illustrates certain aspects of message flow in the apparatus illustrated in FIG. 12.

FIG. 13 includes a simplified representation 1300 of the apparatus 1200 in FIG. 12 and a crossbar mapping 1340 that represents message flow in a VGI interface adapted in accordance with certain aspects disclosed herein. The FSM 1302 in a first device includes a first handler 1304 that manages communication of state of physical GPIO 1322, and a second handler 1306 that manages communication of software events 1324. The FSM 1312 in a second device includes a third handler 1314 that manages communication of state of physical GPIO 1326, and a fourth handler 1316 that manages communication of software events 1328. VGI messages are transmitted over a serial bus 1310 through PHYs 1308, 1318.

Table 1 shows the permutations of VGI transfer between physical GPIO and software events and FIG. 13 includes a corresponding crossbar mapping 1340.

TABLE 1

|  |  | Destination | |
| --- | --- | --- | --- |
|  |  | Physical GPIO | Software Event |
| Source | Physical GPIO | All-Hardware VGI | Hardware-to-Software VGI |
|  | Software Event | Software-to-Hardware VGI | All-Software VGI |

The crossbar mapping 1340 may be applicable to the apparatus 1200 illustrated in FIG. 12, where VGI messages may represent the state of physical GPIO generated and/or monitored by hardware circuits, and events generated and/or consumed by software, and an Application Processor and a Peripheral can be sources and/or destinations for both types of VGI messages.

Certain VGI messages related to physical GPIO 1322 may originate in the first device and terminate in the second device. In one example, the state of a physical GPIO pin may be modified in the first device and a VGI message may be transmitted from the first device to the second device in order to update the state of a corresponding physical GPIO pin in the second device. In another example, the state of a physical GPIO pin may be modified in the first device and a VGI message may be transmitted from the first device to the second device in order to create a software event in the second device.

Certain VGI messages related to physical GPIO 1322 may originate in the second device and terminate in the first device. In one example, the state of a physical GPIO pin may be modified in the second device and a VGI message may be transmitted from the second device to the first device in order to update the state of a corresponding physical GPIO pin in the first device. In another example, the state of a physical GPIO pin may be modified in the second device and a VGI message may be transmitted from the second device to the first device in order to create a software event in the first device.

Certain VGI messages related to software events 1324 may originate in the first device and terminate in the second device. In one example, the occurrence of a software event in the first device may cause a VGI message to be transmitted from the first device to the second device in order to update the state of a physical GPIO pin in the second device. In another example, the occurrence of a software event in the first device may cause a VGI message to be transmitted from the first device to the second device in order to create a corresponding software event in the second device.

Certain VGI messages related to physical GPIO 1322 may originate in the second device and terminate in the first device. In one example, the occurrence of a software event in the second device may cause a VGI message to be transmitted from the second device to the first device in order to update the state of a physical GPIO pin in the first device. In another example, the occurrence of a software event in the second device may cause a VGI message to be transmitted from the second device to the first device in order to create a corresponding software event in the first device.

In one example, an Application Processor 1342 may include a CPU 1344 that manages and/or monitors a modem 1348 in a peripheral device 1346. The modem may generate signals that are transmitted through physical GPIO 1326. The CPU 1344 may be configured according to certain aspects disclosed herein to receive the modem-generated signals as software events 1324. The CPU 1344 may be further configured to aspects disclosed herein to generate software events 1324 relevant to the operation of the modem 1348, where the software events 1324 are converted to physical GPIO 1326 coupled to the modem 1348. Communication between the CPU 1344 and the modem 1348 is illustrated by a diagonal line 1350.

In one example, VGI messages that include state information related to hardware-generated signals such as hardware timers may be directed to physical GPIO that is coupled to circuits that respond to the signals generated by hardware timers. In another example, VGI messages that include state information related to certain hardware-generated events may be converted to a software event in a receiving VGI finite state machine. In the latter example, an application processor may support a limited number of hardware interrupts and it can be useful to convert hardware interrupts from some devices to software interrupts that can be more conveniently serviced by the application processor. In another example, VGI messages that include state information related to certain software-generated events may be converted to hardware GPIO states in a receiving VGI finite state machine. In the latter example, an application processor may generate a software event that is converted to a hardware interrupt at a peripheral device. In another example, VGI messages that include state information related to certain software-generated events may be handled a software events in a receiving VGI finite state machine.

Figure 14:
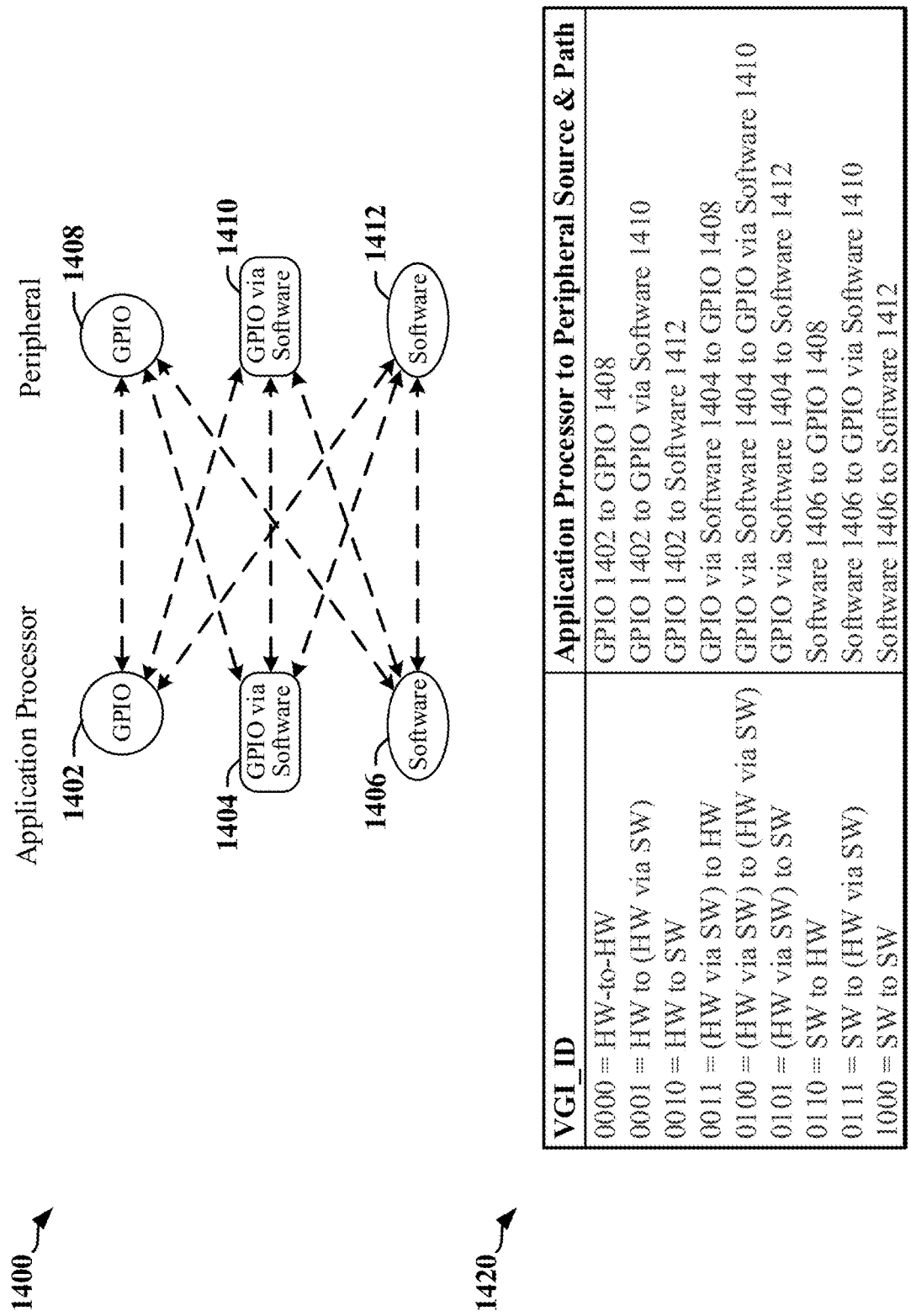
FIG. 14 illustrates an example of crossbar mapping for heterogeneous VGI in accordance with certain aspects disclosed herein.

FIG. 14 illustrates a crossbar mapping 1400 illustrating an expanded implementation of heterogeneous VGI. In many applications, one or more signals transmitted over physical GPIO is created and/or controlled by firmware and/or software. For example, an application may write a binary value to a register that outputs the value on one or more GPIO pins. According to certain aspects disclosed herein, the state of certain GPIO pins may be created and captured using a finite state machine 1206, 1226. In some instances, modules that generate signals transmitted through physical GPIO may be adapted to create VGI messages that represent the signals as a sequence of events corresponding to signaling state changes of the signals. The technique of directly generating VGI messages in place of a physical signal may be referred to herein as software-originated VGI.

Table 2 shows the permutations of VGI transfer corresponding to the crossbar mapping 1400.

TABLE 2

|  |  | Destination | | |
|---|---|---|---|---|
|  |  | HW GPIO | HW via SW GPIO | Software Event |
| Source | HW GPIO | X | X | X |
|  | HW via SW GPIO | X | X | X |
|  | SW Event | X | X | X |

The crossbar mapping 1400 may be applicable to the apparatus 1200 illustrated in FIG. 12, where VGI messages may represent the state of physical GPIO 1402, 1408 generated and/or monitored by hardware circuits, GPIO 1404, 1410 generated and/or monitored by software and software events 1406, 1412 generated and/or consumed by software. An Application Processor and a Peripheral can be sources and/or destinations for both types of VGI messages. In this example, VGI messages generated from any source can be directed to the physical GPIO 1402, 1408, to GPIO 1404, 1410 that is monitored by software, or to handlers that create software events 1406, 1412. In some implementations, command and control messages may be expressions of physical GPIO 1402, 1408, GPIO 1404, 1410 generated and/or monitored by software or software events 1406, 1412. In some implementations, command and control messages may be expressed in physical GPIO 1402, 1408, GPIO 1404, 1410 generated and/or monitored by software or software events 1406, 1412.

Table 3 shows an example in which fewer than all permutations of VGI transfer provided in the crossbar mapping 1400.

TABLE 3

|  |  | Destination | | |
|---|---|---|---|---|
|  |  | HW GPIO | HW via SW GPIO | Software Event |
| Source | HW GPIO | X |  | X |
|  | HW via SW GPIO | X | X | X |
|  | SW Event | X |  | X |

In Table 3, exchanges of VGI messages related to the state of hardware-generated GPIO or software events to hardware GPIO monitored by software is not supported.

Table 2 and the corresponding crossbar mapping 1400 provide up to 9 exchange options when software-originated physical GPIO is distinguished from hardware-originated GPIO and software events. Characteristics of sources and destinations of VGI messages may be identified in the VGI messages using a definition code (VGI_ID). The codes in the table 1420 illustrated in FIG. 14 provides one example of a coding scheme defining VGI_ID values that may be used to manage VGI messages in accordance with the crossbar mapping 1400. The VGI_ID values are expressed in four bits and encode mapping between sources and destinations. MIPI Alliance standards for I3C provide dedicated common command codes (CCCs) that are assigned for VGI messaging. When a receiver detects a VGI CCC, then it recognizes that the corresponding packet includes virtualized GPIO. In conventional systems, the virtualized GPIO is presumed to be representative of hardware generated signaling state of GPIO pins.

Improvements in communication technologies, including the deployment of fourth generation (4G), fifth generation (5G) and later generation radio access technologies, has resulted in increased numbers and types of interconnected devices that must be serviced, monitored or controlled by an application, system or network. The use of standards-defined serial and wireless networks to carry heterogeneous VGI messages can reduce the complexity of infrastructure needed to support the application, system or network. VGI messages may be exchanged over a serial bus or wireless communication link that carries other traffic, including application messages transmitted between devices and/or applications. As applications demand ever increasing throughput and responsiveness, and as the number of sensors, monitors, controllers and other devices connected by a network increase, the ability of the network to support real-time, deterministic applications due to increased bus latencies can be substantially impacted. In conventional systems, VGI messages that include events or state information are transmitted at the earliest opportunity after they become available. Increased network traffic can prevent timely delivery of time-critical VGI messages due to degraded latency and other delays.

According to certain aspects of this disclosure, frequent, repetitive and/or time-critical actions may be defined, communicated and initiated by collecting, accumulating, aggregating or assembling multiple commands or sequences of commands into a "batch" that can be transmitted over a communication link with timing information that can be used to control the initiation of the actions configured by the batch.

In one aspect, batches may be used to monitor or control limited function devices such as RFFE devices, sensors, transducers, Internet of Things (IOT) devices, and so on. Certain devices may be controlled using sequences of small steps including, for example, a stepping motor that requires many GPIO state changes and fine-grained control sequences during operation. These sequences of steps are often repeated in response to a stimulus, command or configured action. In one example, a drone may include multiple stepping motors that may be controlled by a primary sequence of steps that configures a base mode of operation, and by one or more secondary sequences of steps that are initiated in response to a stimulus, such as a signal provided by a sensor indicating loss of trim, change in altitude, etc. In some instances, the primary and secondary sequences of steps differ mainly by rate of execution of the steps. In some instances, stepping motors and other devices may be monitored and controlled by repetitive control sequences transmitted in batches of heterogeneous VGI messages over standards-defined communication links that may carry other conventional traffic.

A mode of control provided in accordance with some aspects of this disclosure can improve efficiency, reduce power consumption and communication overhead in a network interface circuit, reduce network congestion and alleviate throughput and latency requirements. In one example, actions or series of actions to be repeatedly taken at a device may be configured as a command or a batch of commands communicated across an interface, where one or more stimuli can actuate, excite or initiate a series of responses to the commands. The series of responses may include initiating, suspending or terminating an action or a series of actions. The stimuli may be provided by an application, another device or may be generated by the device taking the action or series of actions.

In one example, protocols and techniques provided in accordance with some aspects of this disclosure may be used to configure one or more actions used to control a drone. The one or more actions may be directed to stepping motors in the drone. In one implementation, protocols and techniques provided in accordance with some aspects of this disclosure may be used to pack one or more actions into a batch that operates as a single command to control a RFFE. The one or more actions may coordinate a change in configuration of an RFFE or a component within the RFFE or coupled to the RFFE. In a different example, the one or more actions may change phase settings for an antenna array when the RFFE is configured for beamforming.

Figure 15:
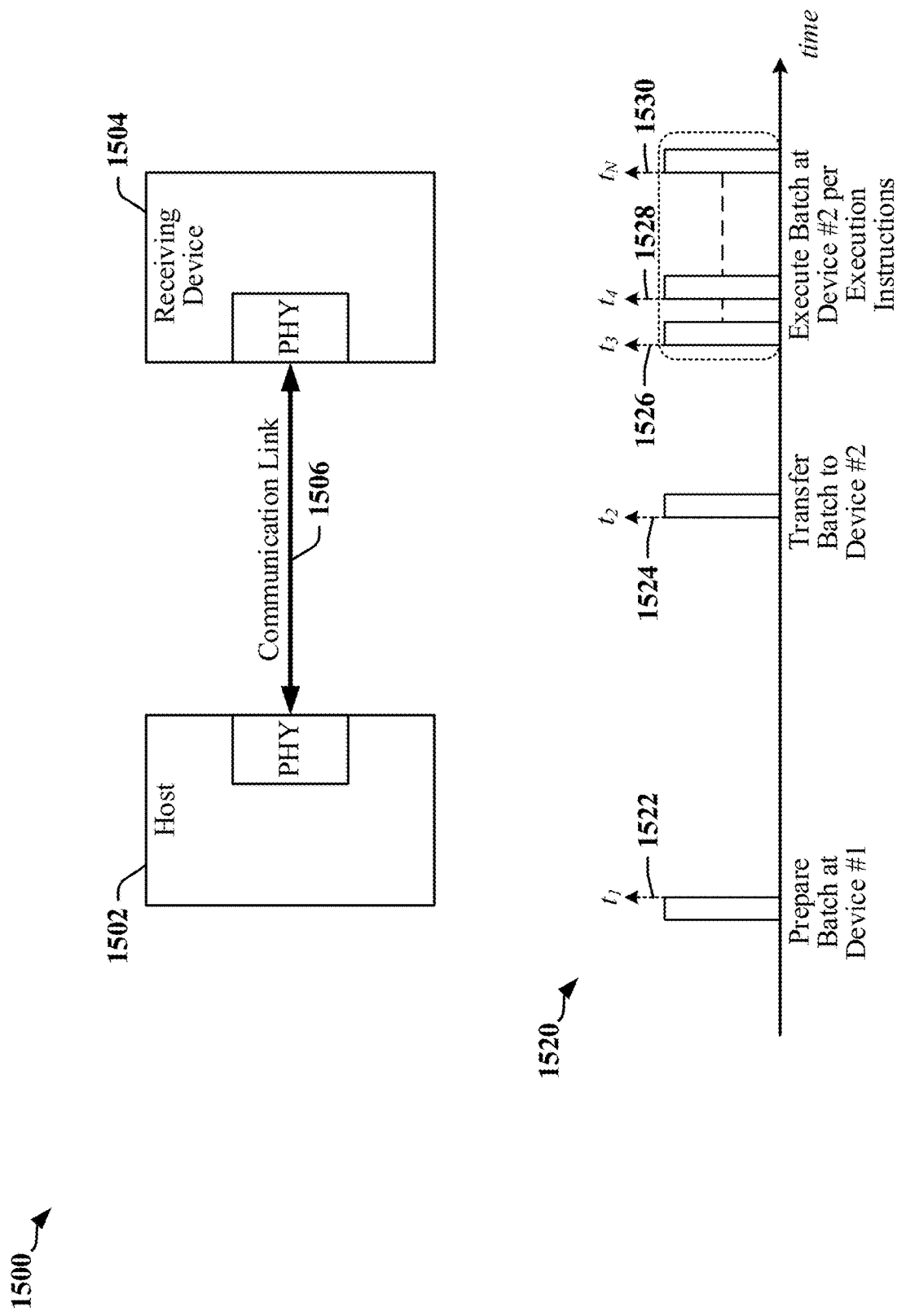
FIG. 15 illustrates an example of a system configured to implement an asynchronous mode of control for devices in accordance with certain aspects disclosed herein.

FIG. 15 illustrates an example of a system 1500 configured to implement an asynchronous mode of control for devices in accordance with certain aspects disclosed herein. Configuration, command and control messages may be packed in a batch and provided to one or more devices to initiate actions taken in accordance with a prescribed or configured timeline. In one example, an extension to conventional protocols is implemented by the system such that a batch or collection of VGI messages is sent from a host device 1502 to a receiving device 1504 for execution in accordance with the prescribed or configured timeline. The VGI messages may include GPIO state information, hardware-generated, software-generated events, timing information, or other control information.

In the system 1500, a host device 1502 is communicatively coupled to a receiving device 1504 through a communication link 1506. The communication link 1506 may be implemented using some combination of wireless and wired links or segments, and the communication link 1506 may be bidirectional or unidirectional. In some instances, the communication link 1506 includes a point-to-point link. In some instances, the communication link 1506 is implemented using a multi-drop serial bus. In some instances, the communication link 1506 is provided through a broadcast wireless communication link. The host device 1502 may be configured to transmit VGI messages and control messages used for asynchronous control or management of the receiving device 1504. The host device 1502 may be configured to receive VGI messages and control messages from the receiving device 1504 and used for asynchronous control or management at the host device 1502. In some implementations, peer devices may exchange VGI messages and control messages used for asynchronous control or management. In some implementations, the host device 1502 may be configured to broadcast VGI messages and control messages used for asynchronous control or management of multiple receiving devices 1504.

The timing diagram 1520 in FIG. 15 illustrates asynchronous control exercised by a first device over a second device. In one example, the timing diagram 1520 corresponds to an example of asynchronous control exercised by the host device 1502 over the receiving device 1504. At a first point in time 1522, the first device may prepare a batch of messages that include GPIO state information, control messages, commands and/or configuration information. The batch of messages may include messages generated by one or more applications and may relate to different functions, events or physical GPIO state. The batch of messages may include information that characterizes GPIO state captured by the first device from physical GPIO state or derived from events generated by applications. The batch of messages may be transmitted in one or more datagrams, packets or transactions. In one example, a message may define state to be set for one or more physical GPIO pins, pads, terminals or interconnects. In another example, a message my include configuration or control commands.

At a second point in time 1524, the first device transmits the batch of messages to the second device. The batch of messages may be transmitted from the first device to the second device over a communication link 1506. In some implementations, the communication link 1506 between the first and second device or may be implemented using a serial bus operated in accordance with RFFE, SPMI, I3C or other such protocols. In some implementations, the communication link 1506 includes a wireless portion.

At a third point in time 1526, one or more actions may be taken by the second device based on the content of the batch of messages. The second device may perform certain actions repetitively at additional points in time 1528, 1530 after the first action is taken. The timing of activities performed in response to the batch of messages may be determined by a timeline that defines a timing configuration provided in advance of the transmission of the batch of messages at the second point in time 1524, or with the batch of messages. The time configuration may be provided through one or more control messages. In some implementations, the timing configuration can be modified after the batch of messages has been received or after certain actions have been taken by the second device. For example, a control message received may be transmitted to modify the timing configuration after a sequence of actions has been configured. The batch of messages may operate as a macro instruction or set of instructions that can be interpreted or executed by the second device.

The timing configuration may identify one or more instructions in the batch of messages that is to be performed periodically or at specified times. The timing configuration may identify one or more instructions in the batch of messages that is to be repeated a defined or configured number of times. The timing configuration may identify a start time for one or more instructions or for a sequence of instructions to be executed. The timing configuration may be implemented using a synchronization event provided by the transmitting device, a receiving device, a master device or another device or system. In some implementations, the batch of messages may include execution parameters that may configure certain aspects of the actions performed at the second device.

In some examples, physical GPIO line state, configuration, command and control messages and/or detected hardware events or software generated events may be generated by multiple sources and transmitted in heterogeneous VGI messages to one or more endpoints. In some examples, physical GPIO line state, configuration, and/or detected hardware events may be generated by multiple sources and transmitted in heterogeneous VGI messages to one or more endpoints and may be interspersed or interleaved with command and control messages, including VGI messages related to software generated events. The mapping of sources to endpoints may be configured according to application needs, and may provide for one-to-one, one-to-many, many-to-one and many-to-many (matrix) exchanges. In a batched mode of operation, sequences of commands and heterogeneous VGI messages associated with a timeline can be assembled and transmitted across a communication link. The timeline may define a time series of physical GPIO state for one or more lines, pins, pads, etc., as well as transitions or changes in physical GPIO state. The timeline may further define a time series of events or event signaling, including changing states of the event signaling within the timeline, where the events or event signaling may have multiple sources or multiple endpoints. The timeline may further define a time series of control messages, where the control messages may have multiple sources or multiple endpoints.

These time series of physical GPIO state, changes in physical GPIO state, events or event signaling, changes in state of the event signaling and control messages can be transmitted at some time after they have been batched in the transmitter. The time series of physical GPIO state, changes in physical GPIO state, events or event signaling, changes in state of the event signaling and control messages may be transmitted using various communication methods or technologies and may be addressed to one or more addresses or broadcast to multiple receivers.

In one aspect, a device control interface is defined that can be used to manage, monitor and control multiple remote devices. A remote device may receive and execute a batch and the timeline, where the batch includes some combination of time series of physical GPIO state, changes in physical GPIO state, events or event signaling, changes in state of the event signaling and control messages. The remote device may receive and execute the batch in accordance with execution parameters defined by the timeline, an application or during device manufacture or initialization.

Figure 16:
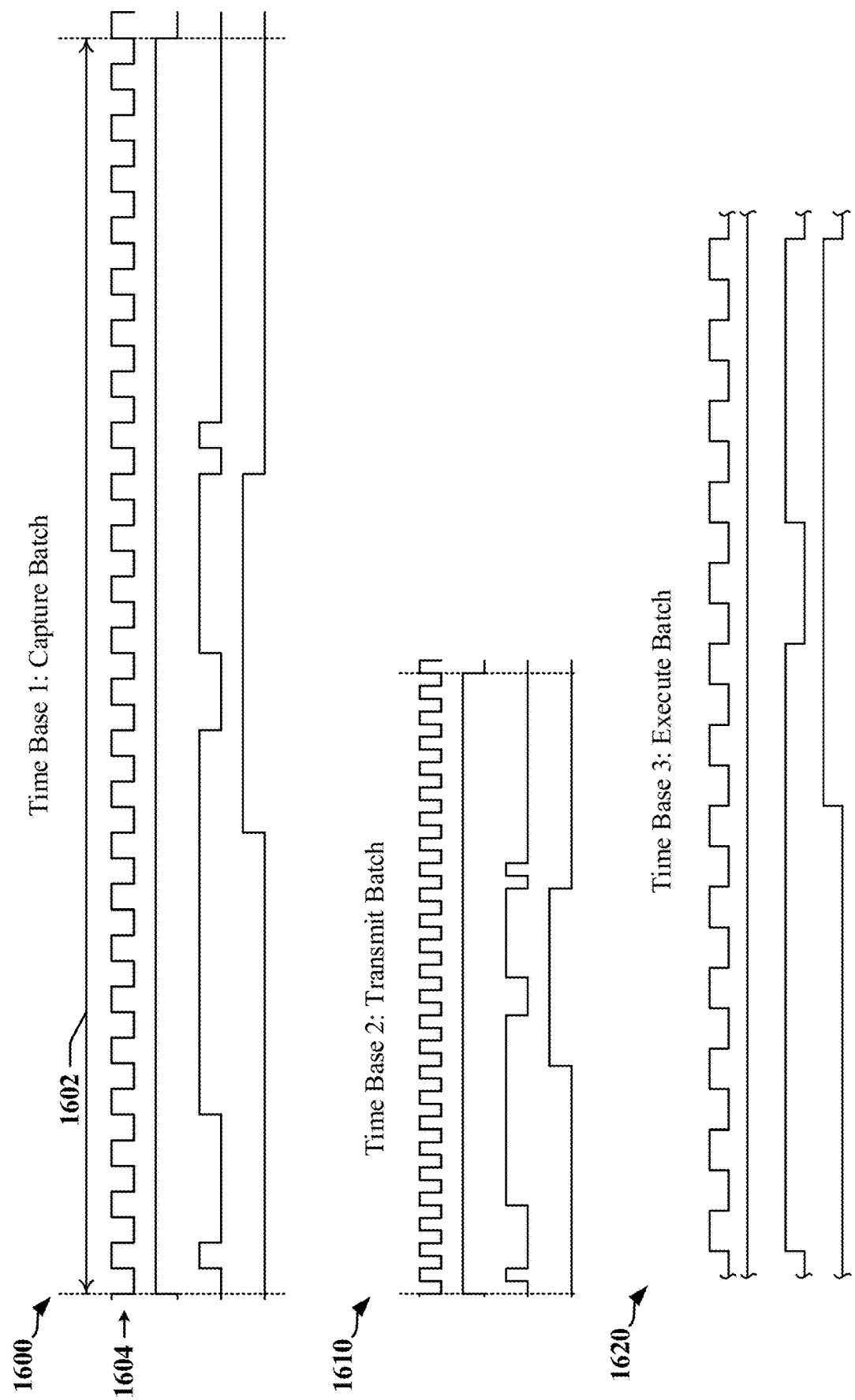
FIG. 16 illustrates batch capture, batch transmission and batch execution in accordance with certain aspects of this disclosure.

FIG. 16 includes timing diagrams 1600, 1610, 1620 illustrating batch capture, batch transmission and batch execution in accordance with certain aspects of this disclosure. The first timing diagram 1600 illustrates the signaling state of 4 GPIO lines, pins, pads or interconnects that would connect two devices in a conventional system. For example, the signaling state of sideband GPIO 420, 422 or 424 of FIG. 4 may be represented. In the example illustrated in FIG. 16, physical interconnects are omitted between the devices and signaling state is communicated in batched VGI messages. A time series of physical GPIO state is captured over a duration 1602 that may correspond to a cycle to be repeated at the receiving device. Captured GPIO state may represent signaling state of GPIO lines, pins, pads or interconnects during a unit interval of time defined for the batch, which may be referred to herein as the state interval. In various examples, a batch of VGI messages may represent or define sampled state of physical GPIO, state of physical GPIO during a state interval that is measured as a half-cycle of a clock signal 1604 that is provided on one of the GPIO lines, pins, pads or interconnects represented in the VGI messages, state of physical GPIO during each cycle of an internal clock signal. Certain VGI messages may represent transitions in signaling state of the physical GPIO. The captured batch of VGI messages may be scaled for transmission or execution.

The second timing diagram 1610 illustrates the use of a compressed second time base to optimize transmission time for the captured batch of VGI messages. In one example, the captured batch of VGI messages may be captured in real time using the first time base, and a second compressed time base may be used to conform the clock signal 1604 used to control capture of the batch of VGI messages to a clock signal used to control transmissions over the serial bus. In this example, the clock signal used to control transmissions over the serial bus has a higher frequency than the clock signal 1604 used to control capture of the batch of VGI messages. In other examples, an expanded time base may be used to conform the clock signal 1604 used to control capture of the batch of VGI messages to a clock signal used to control transmissions over the serial bus. In this example, the clock signal used to control transmissions over the serial bus has a lower frequency than the clock signal 1604 used to control capture of the batch of VGI messages.

The third timing diagram 1620 illustrates a portion of the captured GIO state when a stretched or expanded third time base is used to control execution of the captured batch of VGI messages. In some instances, the first time base enables the batch of VGI messages to be captured faster than real time with respect to the receiving device, and the third time base is used to control the timing of execution of the batch in order to produce a real-time time series of state at the physical GPIO in the receiving device. In other instances, the third time base enables the batch to be executed faster than the first or second time bases when the batch is captured using a sampling clock and transmitted using a transmission clock that have a lower frequency than the clock signal in the receiving device that controls execution of the batch. The batch may be repeated one or more times or for a duration defined by execution parameters. In some instances, some portions of the batch may be repeated one or more times or for a duration defined by execution parameters, while other portions of the batch may be executed once.

The device control interface disclosed herein enables the time base to be scaled, cyclic and offset as desired. Scaling may be used to control timing of execution of the batch as described in relation to FIG. 16, for example. The batch may be executed periodically. In some instances, execution of the batch may be restarted immediately following each completed execution of the batch. In other instances, execution of the batch may be initiated at configured rate or according to defined by execution parameters where, for example, an execution may have been completed for some period of time before a next execution is initiated. In other instances, execution of the batch may be initiated according to a schedule configured by the batch or defined by execution parameters.

Figure 17:
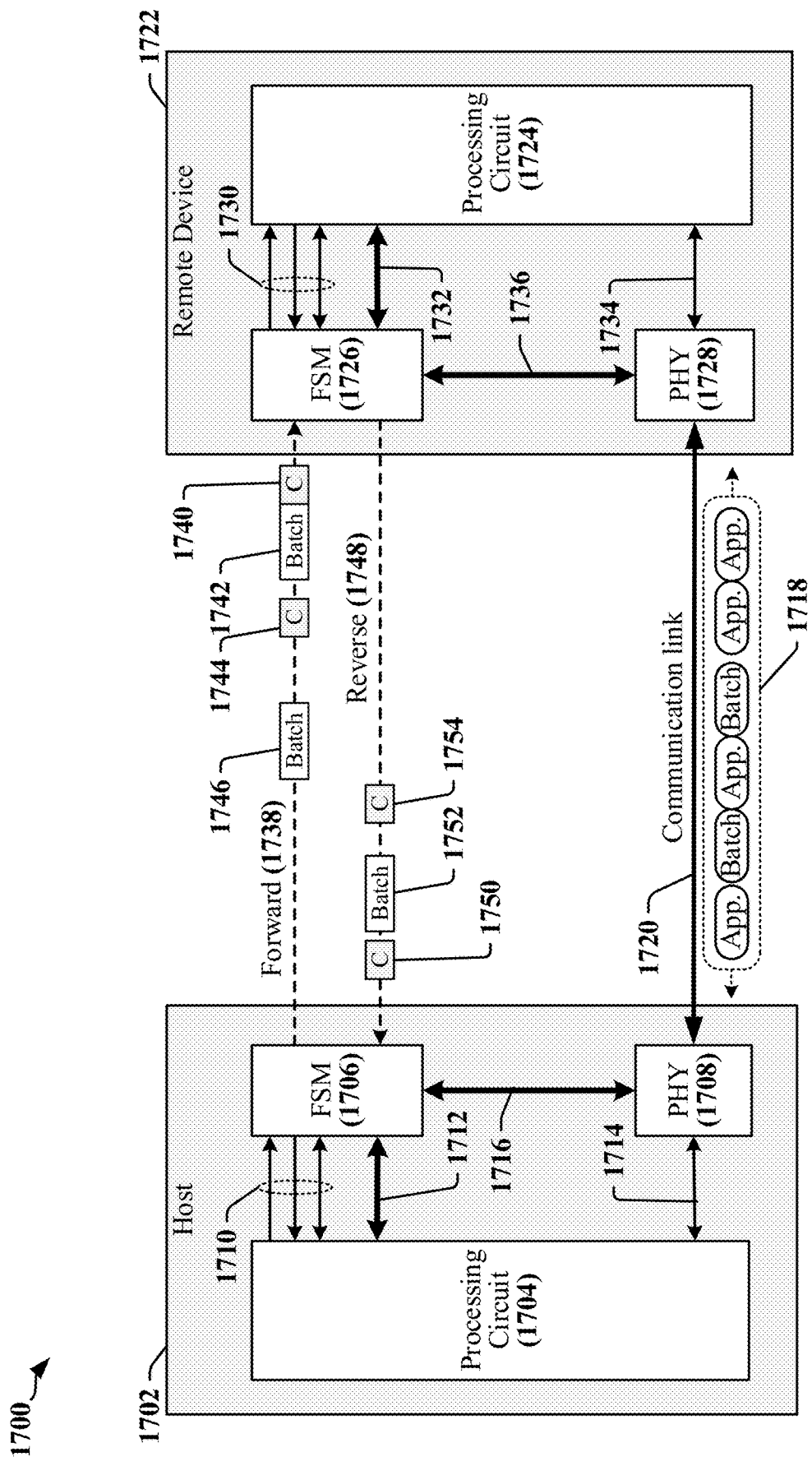
FIG. 17 illustrates the operation of a device control interface configured in accordance with certain aspects of this disclosure.

FIG. 17 illustrates the operation of a device control interface 1700 configured in accordance with certain aspects of this disclosure. The illustrated device control interface 1700 is implemented with a communication link 1720 that provides a communication link between a host device 1702 and a remote device 1722. In one example, the host device 1702 is configured to operate as a bus master and the remote device 1722 is configured to operate as a slave. The device control interface 1700 may be configured to enable the host device 1702 and the remote device 1722 to exchange messages 1718 that include combinations of application messages, control messages and VGI messages. The host device 1702 and the remote device 1722 may be configured to assemble and transmit batches of heterogeneous VGI messages, command and control messages with timelines configured to control execution of associated batches. The host device 1702 and the remote device 1722 may be further configured to receive batches of heterogeneous VGI messages and command and control messages and to execute received batches in accordance with received timelines.

In the illustrated device control interface 1700, the host device 1702 may be coupled to one or more peripheral devices that drive signaling state 1710 of physical GPIO lines, pins or pads or that respond to signaling state 1710 of physical GPIO lines, pins or pads. In some examples, a processing circuit 1704 in the host device 1702 may generate command and control messages, events, and/or virtual state information 1712 configured to control signaling state of physical GPIO lines, pins or pads at the remote device 1722. The illustrated host device 1702 includes a finite state machine (the FSM 1706) configured to receive the signaling state 1710 of physical GPIO lines, pins or pads captured at the host device 1702 and the command and control messages, events, and/or virtual state information 1712 generated by the processing circuit 1704. The FSM 1706 may be configured to generate VGI messages representing physical GPIO state and VGI messages that includes virtual state information 1712 generated by the processing circuit 1704. The FSM 1706 may be further configured to combine the VGI messages with corresponding timelines to obtain batches 1716 that can be transmitted to the remote device 1722 through a bus interface physical circuit (the PHY 1708) over the communication link 1720 in accordance with a bus protocol used to control transmissions over the communication link 1720. The PHY 1708 may be configured to transmit application-related messages 1714 with the host-generated batches to the remote device 1722 over the communication link 1720. The transmitted application-related messages 1714 may be received from the processing circuit 1704.

The PHY 1708 may provide the FSM 1706 with batches 1716 received from the remote device 1722. The FSM 1706 may be configured to unpack and/or execute received batches 1716 according to the timelines associated with the batches 1716. In one example, the FSM 1706 may be configured to extract and decode VGI messages from the batches to drive signaling state 1710 of certain physical GPIO lines, pins or pads or to provide decoded commands, events, and/or virtual state information 1712 to the processing circuit 1704. The PHY 1708 may be configured to receive application-related messages 1714 from the communication link 1720 and to provide the application-related messages 1714 to the processing circuit 1704.

In the illustrated device control interface 1700, the remote device 1722 may be coupled to one or more peripheral devices that drive signaling state 1730 of physical GPIO lines, pins or pads or that respond to signaling state 1730 of physical GPIO lines, pins or pads. In some examples, a processing circuit 1724 in the remote device 1722 may generate command and control messages, events, and/or virtual state information 1732 configured to control signaling state of physical GPIO lines, pins or pads at the host device 1702. The illustrated remote device 1722 includes a finite state machine (the FSM 1726) configured to receive the signaling state 1730 of physical GPIO lines, pins or pads captured at the remote device 1722 and the command and control messages, events, and/or virtual state information 1732 generated by the processing circuit 1724. The FSM 1726 may be configured to generate VGI messages representing physical GPIO state and VGI messages that includes virtual state information 1732 generated by the processing circuit 1724. The FSM 1726 may be further configured to combine the VGI messages with corresponding timelines to obtain batches 1736 that can be transmitted to the host device 1702 through a bus interface physical circuit (the PHY 1728) over the communication link 1720 in accordance with a bus protocol used to control transmissions over the communication link 1720. The PHY 1728 may be configured to transmit application-related messages 1734 with the remotely-generated batches to the host device 1702 over the communication link 1720. The transmitted application-related messages 1734 may be received from the processing circuit 1724.

The PHY 1728 may provide the FSM 1726 with batches 1736 received from the host device 1702. The FSM 1726 may be configured to unpack or execute received batches 1736 according to the timelines associated with the batches 1736. In one example, the FSM 1726 may be configured to extract and decode VGI messages from the batches to drive signaling state 1730 of certain physical GPIO lines, pins or pads or to provide decoded commands, events, and/or virtual state information 1732 to the processing circuit 1724. The PHY 1728 may be configured to receive application-related messages 1734 from the communication link 1720 and to provide the application-related messages 1734 to the processing circuit 1724.

According to certain aspects of this disclosure, a device that receives a batch may "execute the batch" in accordance with the timeline and in a manner comparable to a macro. A macro may be defined as a sequence or series of commands and instructions provided as a group that is executed as a single command. A macro may be used to automatically initiate or perform a series of actions or functions. In some implementations, a batch may include one or more time series of physical GPIO state, changes in physical GPIO state, events or event signaling, changes in state of the event signaling and control messages, where each time series may be executed independently, or in a sequence defined by a timeline.

In accordance with certain aspects of the disclosure, a batch may be used by a first device to control a second device, to support inter-process communication (IPC) and/or to support synchronization between devices. In one example a batch may include a sequence of state for one or more physical GPIO lines, pins or pads, including changes in state within the timeline. In another example a batch may include a sequence of events of one or more types, including changes in event status within the timeline. In another example a batch may include a sequence of control messages of one or more types, received from one or more sources or directed to one or more destinations.

In the illustrated device control interface 1700, the use of a batch of consolidated VGI messages can enable a host device 1702 to control a peripheral coupled to a remote device 1722 based on an execution timeline identified with the batch. The batch and timeline can supplant command and control signals transmitted over physical sideband GPIO. The use of a batch and a timeline enables the host device 1702 to generate control signaling using a first time base, permit the host device 1702 to transmit the batch according to a second time base and enable the peripheral at the remote device 1722 to operate according to a third time base. The time bases may define different frequencies for a clock signal used to capture the batch and a clock signal used to time the execution of the batch. The time bases may define different run times for the batch at points of origin and execution. The time bases may define a start time for executing the batch or different start times for different portions of the batch. The timeline may define a mode of repetition for execution of the batch, including one-time execution (no repetition), continuous repetition whereby a subsequent execution restarts immediately after finishing a previous execution, periodic execution, whereby execution of the batch is initiated at a defined rate, and scheduled execution whereby each execution has a defined start time. The timeline may define a number of executions to be performed. The timeline may define a time when execution is to be terminated or an end time after which no further repetitions of batch execution is to be performed.

In certain aspects, timelines may be transmitted independently of their associated batches. In some instances, the timelines may be provided in advance of their associated batches. In some instances, the timelines may be provided through out-of-band communication. In some instances, timelines may be updated by the host device 1702 or by the remote device 1722 based on changes in operating conditions, receipt of an application request, or in response to a control mechanism associated with one or more peripherals. The time base used to execute a batch may define a unit interval for asserting or modifying signaling state of GPIO. In one example, a device may be controlled according to a time base that provides one transitive state every microsecond (i.e., the state interval=1 µs).

A receiver may check the fidelity of the received message and may request retransmission when an error is detected. In some instances, the receiver may acknowledge transmission by transmitting an ACK when the message is received correctly. In some instances, the receiver may acknowledge transmission by transmitting an ACK when one or more actions specified by the batch has been completed successfully. The FSM 1706, 1726 may be configured to pack, unpack batches transmitted in one or more messages that have been adapted, configured or defined for the device control interface 1700. The FSM 1706, 1726 may be operated such that both local and remote peripherals can be controlled transparently.

According to certain aspects, system design may be simplified or optimized using the device control interface 1700. In one example, peripheral controllers and processors in remote devices can be simplified or omitted when a host device 1702 can use a hardware-only control interface, whereby remote peripherals are controlled through the operation of FSM 1726. The ability of host devices 1702 to control remote peripherals can reduce pin count and complexity of certain devices such as sensors and other IoT devices.

According to certain aspects, multiple batches with corresponding timelines may be created and provided to remote devise to enable rapid reconfiguration or changes in function of the remote device or the remote peripherals. In some instances, a single batch may be provided with multiple timelines that accommodate changes in operating conditions or implement different operating modes. The multiple timelines may define different state intervals, delays, time bases, start times, periodicity or execution schedules. A batch and/or timeline can be selected based on current or specified operating conditions.

According to certain aspects, the device control interface 1700 can operate using any type of communication link 1720, included wired and wireless links. In many applications, host control and device execution can be decoupled in time through the use of a batch with associated timeline. Such decoupling enables the device control interface 1700 to tolerate delays and latencies associated with the communication link. In some implementations, the PHY 1708, 1728 may transmit batches 1716, 1736 in one or more packets, datagrams or transactions without affecting continuity of operation of the remote peripheral that would be experienced in a conventional system. In another example, the host device 1702 may transmit a batch and corresponding timeline with sufficient time margin before execution is scheduled to commence such that significant transmission delays can be accommodated. In another example, the PHY 1708, 1728 may split a batch during packetization without transmitting complete individual VGI messages in the same datagram or packet. The flexibility offered by these and other aspects permit a wide range of wired and wireless communication links to be employed for connecting the host device 1702 with the remote device 1722.

Some procedures defined in accordance with certain aspects of the disclosure can condition execution of batches in the remote device 1722 on specified execution parameters, such as defined or configured delays, time bases, and operating state and conditions at the remote peripheral. The ability to transmit a batch once and execute the batch many times can reduce host-to-device communication overhead. The ability to modify operation through the provision of different timelines can also reduce host-to-device communication overhead. In some instances, the remote device 1722 may be configured with multiple timelines, enabling rapid reconfiguration of the remote device 1722 or remote peripheral. Reductions in communication overhead and reduce network or bus utilization and can provide increased network or bus capacity while reducing power consumption at the host device 1702 and remote device 1722.

According to certain aspects, the device control interface 1700 can enable a remote device 1722 to operate autonomously. Autonomous operation may enable the remote device 1722 to reconfigure or reset itself without requiring the activation of the PHY 1728 or without availability of an established connection with the host device 1702. For example, the PHY 1728 may be used to connect to a wireless network and may be idled or placed in power-saving hibernation after receiving one or more batches with corresponding timelines.

According to certain aspects, the device control interface 1700 can implement a common high-level batch protocol and/or language that permits control of local and remote devices independently of the network or communication link architecture. Independence from network or communication link architecture can permit seamless reconfiguration of a system and can facilitate rapid redeployment of peripherals and remote devices across the system. Certain aspects of the device control interface 1700 are compatible with multiple network or communication link architectures. The device control interface 1700 can be operated in one or more modes, including half-duplex, full-duplex, one-way, multi-drop, broadcast or multicast modes.

According to certain aspects, a timeline may be communicated a priori or in the same message that carries the batch. In one example, the timeline may define a time base in a configuration message that writes or defines a base toggle rate. The base toggle rate defines the rate at which state can change. In one example, the configuration message may define a base toggle rate of 1 MHz such that each state or event can change every microsecond. In another example, the configuration message may cause the remote device to use a toggle rate that is derived from the data rate of the received message. In some instances, the toggle rate is implemented in the receiving device using a free-running clock. In some instances, the toggle rate is implemented in the receiving device using a clock signal received from a serial bus or from a wireless radio transceiver. The toggle rate and/or the method for implementing the toggle rate may be configured using in-band or out-of-band signaling or messaging. The toggle rate may be configured statically or dynamically.

According to certain aspects, each batch item can be executed after a specific time offset relative to a shared reference point in time. The reference point in time may be indicated through a communication link or may be determinable or arbitrarily set by the remote device 1722.

FIG. 17 further includes an illustration of message flows 1738 and 1748 associated with batch and timelines exchanged in the device control interface 1700. The forward message flow 1738 shows only the batch and timelines transmitted from the host device 1702 to the remote device 1722. The reverse message flow 1748 shows only the batch and timelines transmitted from the remote device 1722 to the host device 1702. According to certain aspects disclosed herein, a batch 1742, 1746, 1752 may be preceded in transmission by a protocol header 1740, 1744, 1750 that indicates to the receiver the nature of one or more following packets, datagrams or fields of a packets or datagram. In some instances, a protocol header 1754 may be transmitted without a following batch. The protocol header 1740, 1744, 1750, 1754 may include fields that identify a following batch, indicate whether a batch follows, and define an execution mode for one or more batches 1742, 1746, 1752. For example, protocol header 1740, 1744, 1750 may identify and define the functionality of the payload in the subsequent batch 1742, 1746, 1752. The protocol headers 1740, 1744, 1750 may also identify the timeline to be used when executing the 1742, 1746, 1752. The protocol headers 1740, 1744, 1750 may also define parameters that indicate how the batch should be executed. An unaccompanied protocol header 1754 may identify a payload in a previous batch 1736 and may modify the execution parameters for the previous batch 1736. For example, the unaccompanied protocol header 1754 may indicate that the previous batch 1736 should be executed at double the time base frequency (i.e., the state interval is to be halved).

Examples of Processing Circuits and Methods

Figure 18:
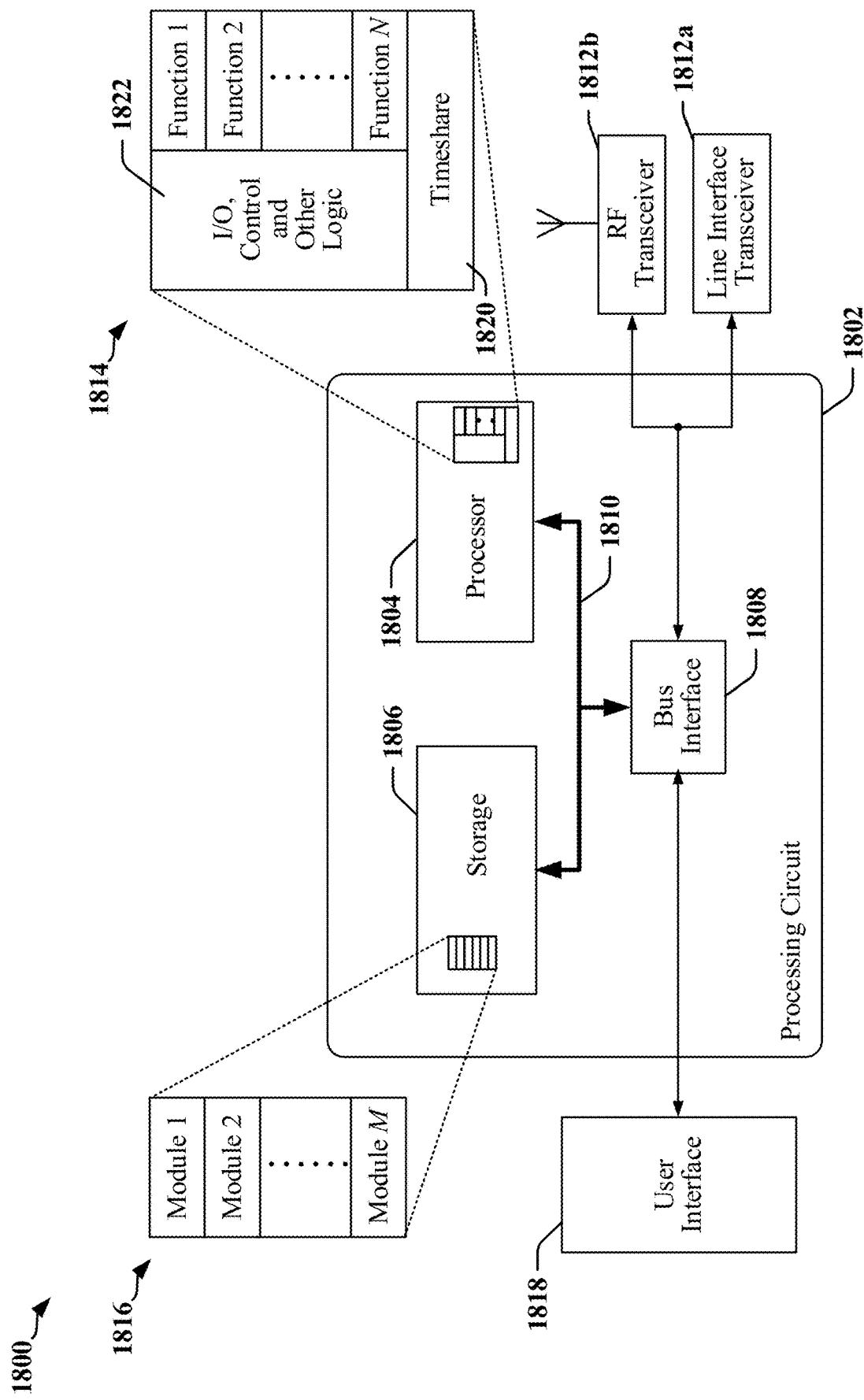
FIG. 18 illustrates one example of an apparatus employing a processing circuit that may be adapted according to certain aspects disclosed herein.

FIG. 18 is a diagram illustrating an example of a hardware implementation for an apparatus 1800 employing a finite state machine 810 to optimize virtual GPIO latency. In some examples, the apparatus 1800 may configure the operation of the finite state machine 810. In some examples, the apparatus 1800 may perform one or more functions disclosed herein. In accordance with various aspects of the disclosure, an element, or any portion of an element, or any combination of elements as disclosed herein may be implemented using a processing circuit 1802. The processing circuit 1802 may include one or more processors 1804 that are controlled by some combination of hardware and software modules. Examples of processors 1804 include microprocessors, microcontrollers, DSP, GPU, SoCs, ASICs, field programmable gate arrays (FPGAs), programmable logic devices (PLDs), state machines, sequencers, gated logic, discrete hardware circuits, and other suitable hardware configured to perform the various functionality described throughout this disclosure. The one or more processors 1804 may include specialized processors that perform specific functions, and that may be configured, augmented or controlled by one of the software modules 1816. The one or more processors 1804 may be configured through a combination of software modules 1816 loaded during initialization, and further configured by loading or unloading one or more software modules 1816 during operation.

In the illustrated example, the processing circuit 1802 may be implemented with a bus architecture, represented generally by the bus 1810. The bus 1810 may include any number of interconnecting buses and bridges depending on the specific application of the processing circuit 1802 and the overall design constraints. The bus 1810 links together various circuits including the one or more processors 1804, and storage 1806. Storage 1806 may include memory devices and mass storage devices, and may be referred to herein as computer-readable media and/or processor-readable media. The bus 1810 may also link various other circuits such as timing sources, timers, peripherals, voltage regulators, and power management circuits. A bus interface 1808 may provide an interface between the bus 1810 and one or more transceivers 1812a, 1812b. A transceiver 1812a, 1812b may be provided for each networking technology supported by the processing circuit. In some instances, multiple networking technologies may share some or all of the circuitry or processing modules found in a transceiver 1812a, 1812b. Each transceiver 1812a, 1812b provides a means for communicating with various other apparatus over a transmission medium. In one example, a transceiver 1812a may be used to couple the apparatus 1800 to a multi-wire bus. In another example, a transceiver 1812b may be used to connect the apparatus 1800 to a wireless network. Depending upon the nature of the apparatus 1800, a user interface 1818 (e.g., keypad, display, speaker, microphone, joystick) may also be provided, and may be communicatively coupled to the bus 1810 directly or through the bus interface 1808.

A processor 1804 may be responsible for managing the bus 1810 and for general processing that may include the execution of software stored in a computer-readable medium that may include the storage 1806. In this respect, the processing circuit 1802, including the processor 1804, may be used to implement any of the methods, functions and techniques disclosed herein. The storage 1806 may be used for storing data that is manipulated by the processor 1804 when executing software, and the software may be configured to implement any one of the methods disclosed herein.

One or more processors 1804 in the processing circuit 1802 may execute software. Software shall be construed broadly to mean instructions, instruction sets, code, code segments, program code, programs, subprograms, software modules, applications, software applications, software packages, routines, subroutines, objects, executables, threads of execution, procedures, functions, algorithms, etc., whether referred to as software, firmware, middleware, microcode, hardware description language, or otherwise. The software may reside in computer-readable form in the storage 1806 or in an external computer-readable medium. The external computer-readable medium and/or storage 1806 may include a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a "flash drive," a card, a stick, or a key drive), RAM, ROM, a programmable read-only memory (PROM), an erasable PROM (EPROM) including EEPROM, a register, a removable disk, and any other suitable medium for storing software and/or instructions that may be accessed and read by a computer. The computer-readable medium and/or storage 1806 may also include, by way of example, a carrier wave, a transmission line, and any other suitable medium for transmitting software and/or instructions that may be accessed and read by a computer. Computer-readable medium and/or the storage 1806 may reside in the processing circuit 1802, in the processor 1804, external to the processing circuit 1802, or be distributed across multiple entities including the processing circuit 1802. The computer-readable medium and/or storage 1806 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The storage 1806 may maintain software maintained and/or organized in loadable code segments, modules, applications, programs, etc., which may be referred to herein as software modules 1816. Each of the software modules 1816 may include instructions and data that, when installed or loaded on the processing circuit 1802 and executed by the one or more processors 1804, contribute to a run-time image 1814 that controls the operation of the one or more processors 1804. When executed, certain instructions may cause the processing circuit 1802 to perform functions in accordance with certain methods, algorithms and processes described herein.

Some of the software modules 1816 may be loaded during initialization of the processing circuit 1802, and these software modules 1816 may configure the processing circuit 1802 to enable performance of the various functions disclosed herein. For example, some software modules 1816 may configure internal devices and/or logic circuits 1822 of the processor 1804, and may manage access to external devices such as the transceiver 1812a, 1812b, the bus interface 1808, the user interface 1818, timers, mathematical coprocessors, and so on. The software modules 1816 may include a control program and/or an operating system that interacts with interrupt handlers and device drivers, and that controls access to various resources provided by the processing circuit 1802. The resources may include memory, processing time, access to the transceiver 1812a, 1812b, the user interface 1818, and so on.

One or more processors 1804 of the processing circuit 1802 may be multifunctional, whereby some of the software modules 1816 are loaded and configured to perform different functions or different instances of the same function. The one or more processors 1804 may additionally be adapted to manage background tasks initiated in response to inputs from the user interface 1818, the transceiver 1812a, 1812b, and device drivers, for example. To support the performance of multiple functions, the one or more processors 1804 may be configured to provide a multitasking environment, whereby each of a plurality of functions is implemented as a set of tasks serviced by the one or more processors 1804 as needed or desired. In one example, the multitasking environment may be implemented using a timesharing program 1820 that passes control of a processor 1804 between different tasks, whereby each task returns control of the one or more processors 1804 to the timesharing program 1820 upon completion of any outstanding operations and/or in response to an input such as an interrupt. When a task has control of the one or more processors 1804, the processing circuit is effectively specialized for the purposes addressed by the function associated with the controlling task. The timesharing program 1820 may include an operating system, a main loop that transfers control on a round-robin basis, a function that allocates control of the one or more processors 1804 in accordance with a prioritization of the functions, and/or an interrupt driven main loop that responds to external events by providing control of the one or more processors 1804 to a handling function.

Figure 19:
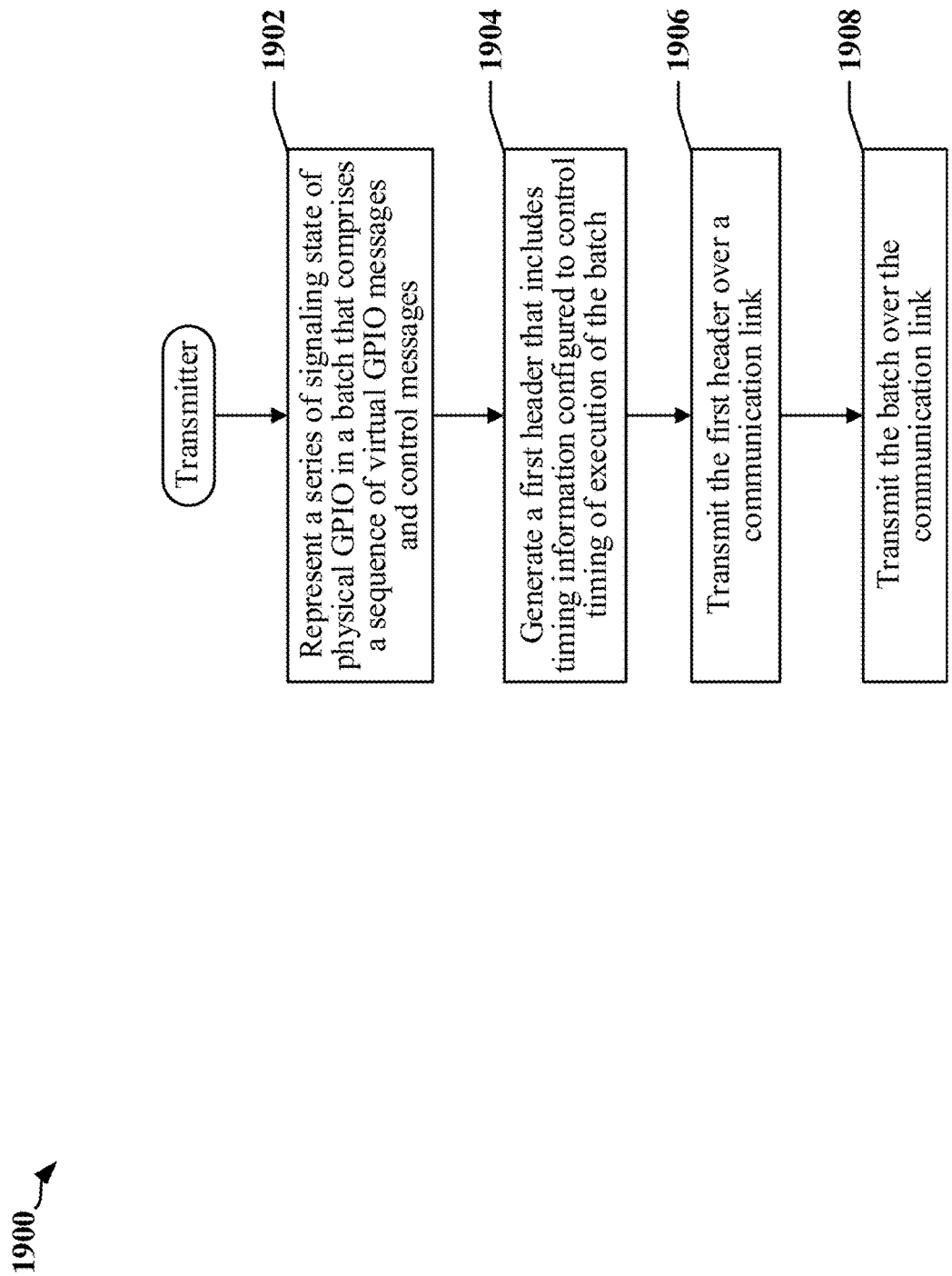
FIG. 19 is a first flowchart illustrating certain operations of an application processor adapted in accordance with certain aspects disclosed herein.

FIG. 19 is a flowchart 1900 of a method that may be performed at a device coupled to a communication link. Certain circuits involved in executing the method may be configured by a finite state machine. Additionally, or alternatively, a finite state machine may perform certain portions of the method.

At block 1902, the device may represent a series of signaling state of physical GPIO in a batch that includes a sequence of virtual GPIO messages and control messages. At block 1904, the device may generate a first header that includes timing information configured to control timing of execution of the batch. At block 1906, the device may transmit the first header over a communication link. At block 1908, the device may transmit the batch over the communication link.

In some examples, the device may receive an event from a processing circuit and represent the event in one of the virtual GPIO message included in the sequence of virtual GPIO messages and control messages. The device may capture the series of signaling state from the physical GPIO using a first time base that controls rate of capture of signaling state. The timing information may define a second time base for extracting GPIO signaling state from the sequence of virtual GPIO messages and control messages, the second time base being different from the first time base. In some instances, at least some of the series of signaling state of the GPIO may be received from a processing circuit.

In various implementations, the timing information defines a state interval corresponding to a duration of GPIO signaling state represented by each virtual GPIO message included in the sequence of virtual GPIO messages and control messages. The timing information may define a delay to be observed before extracting GPIO signaling state from the sequence of virtual GPIO messages and control messages. The timing information may define a repetition rate for repeatedly extracting GPIO signaling state from the sequence of virtual GPIO messages.

In some examples, the device may generate a second header that modifies the timing information provided in the first header and transmit the second header over the communication link after transmitting the batch. In some implementations, the series of signaling state of the physical GPIO is configured to control a peripheral in a remote device accessible through the communication link. The communication link may include a serial bus or a wireless network.

Figure 20:
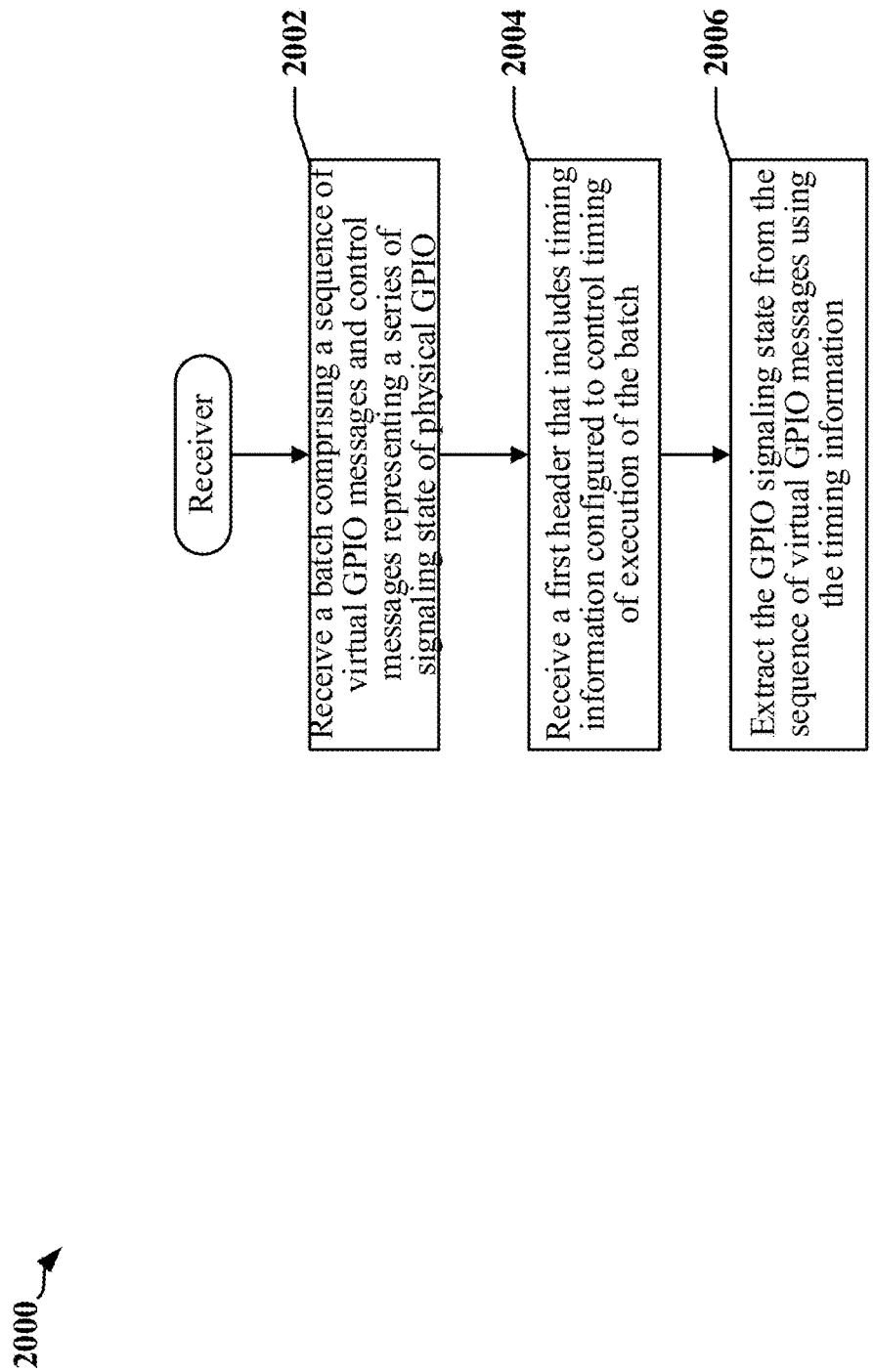
FIG. 20 is a second flowchart illustrating certain operations of an application processor adapted in accordance with certain aspects disclosed herein.

FIG. 20 is a flowchart 2000 of a method that may be performed at a device coupled to a communication link. Certain circuits involved in executing the method may be configured by a finite state machine. Additionally, or alternatively, a finite state machine may perform certain portions of the method.

At block 2002, the device may receive a batch including a sequence of control messages and virtual GPIO messages representing a series of signaling state of physical GPIO. At block 2004, the device may receive a first header that includes timing information configured to control timing of execution of the batch. At block 2006, the device may extract the GPIO signaling state from the sequence of control messages and virtual GPIO messages using the timing information.

In various examples, at least one message in the sequence of control messages and virtual GPIO messages represents an event directed to a processing circuit. The timing information may define a time base for extracting GPIO signaling state from the sequence of control messages and virtual GPIO messages.

In some implementations, the timing information defines a state interval corresponding to a duration of GPIO signaling state represented by each virtual GPIO message included in the sequence of control messages and virtual GPIO messages, a delay to be observed before extracting GPIO signaling state from the sequence of control messages and virtual GPIO messages, or a repetition rate for repeatedly extracting GPIO signaling state from the sequence of control messages and virtual GPIO messages.

In some examples, the device may receive a second header that includes modified timing information and extract the GPIO signaling state from the sequence of control messages and virtual GPIO messages using the modified timing information. The device may control a peripheral using repetitions of the series of signaling state of the physical GPIO. The communication link may include a serial bus or a wireless network.

Figure 21:
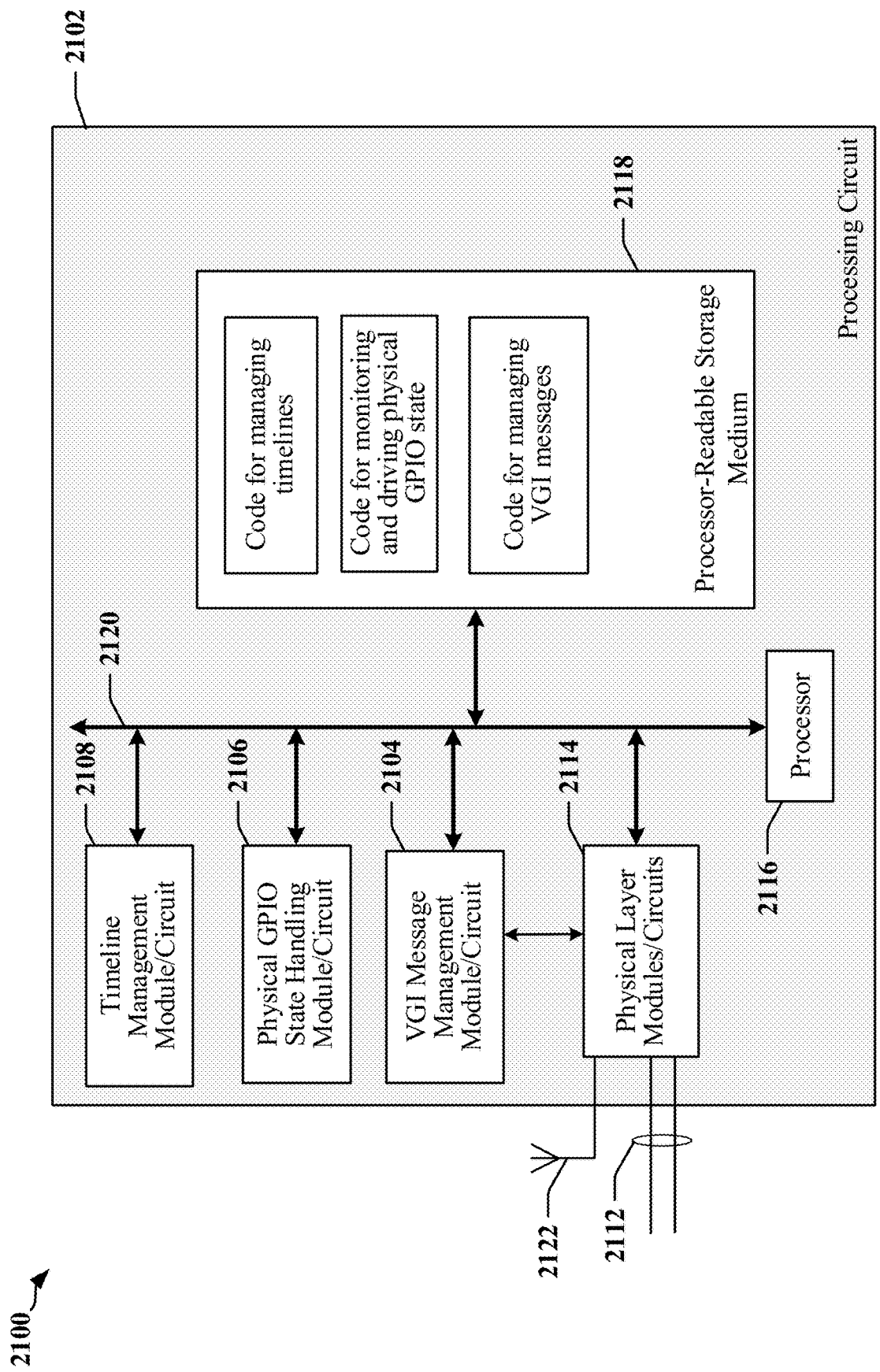
FIG. 21 illustrates an example of a hardware implementation for an apparatus adapted in accordance with certain aspects disclosed herein.

FIG. 21 is a diagram illustrating a simplified example of a hardware implementation for an apparatus 2100 employing a processing circuit 2102. The apparatus may implement a bridging circuit in accordance with certain aspects disclosed herein. The processing circuit typically has a controller or processor 2116 that may include one or more microprocessors, microcontrollers, digital signal processors, sequencers and/or state machines. The processing circuit 2102 may be implemented with a bus architecture, represented generally by the bus 2120. The bus 2120 may include any number of interconnecting buses and bridges depending on the specific application of the processing circuit 2102 and the overall design constraints. The bus 2120 links together various circuits including one or more processors and/or hardware modules, represented by the controller or processor 2116, the modules or circuits 2104, 2106 and 2108, and the processor-readable storage 2118. One or more physical layer circuits and/or modules 2114 may be provided to support communications over a communication link implemented using a multi-wire bus 2112, through an antenna 2122 (to a wireless network for example), and so on. The bus 2120 may also link various other circuits such as timing sources, peripherals, voltage regulators, and power management circuits, which are well known in the art, and therefore, will not be described any further.

The processor 2116 is responsible for general processing, including the execution of software, code and/or instructions stored on the processor-readable storage 2118. The processor-readable storage 2118 may include a non-transitory storage medium. The software, when executed by the processor 2116, causes the processing circuit 2102 to perform the various functions described supra for any particular apparatus. The processor-readable storage medium may be used for storing data that is manipulated by the processor 2116 when executing software. The processing circuit 2102 further includes at least one of the modules 2104, 2106 and 2108. The modules 2104, 2106 and 2108 may be software modules running in the processor 2116, resident/stored in the processor-readable storage 2118, one or more hardware modules coupled to the processor 2116, or some combination thereof. The modules 2104, 2106 and 2108 may include microcontroller instructions, state machine configuration parameters, or some combination thereof.

In one configuration, the apparatus 2100 includes modules and/or circuits 2108 configured to configure and/or manage timelines, including time bases used for sampling or generating GPIO state, modules and/or circuits 2108 configured to handle GPIO state, including sampling and driving GPIO state. The apparatus 2100 may include modules and/or circuits 2104 configured to manage packets and datagrams that include VGI messages, including VGI messages related to physical GPIO, software events, software-initiated hardware, software-monitored hardware GPIO, etc.

In one example, the apparatus 2100 includes a transceiver circuit configured to couple the apparatus 2100 to a remote device through a communication link, and a controller, processor or FSM configured to represent a series of signaling state of physical GPIO in a batch that includes a sequence of control messages and virtual GPIO messages, generate a first header that includes timing information configured to control timing of execution of the batch, transmit the first header over a communication link, and transmit the batch over the communication link.

The controller, processor or FSM may be further configured to receive a first portion of the series of signaling state from a processing circuit, and capture a second portion the series of signaling state from the physical GPIO using a first time base that controls rate of capture of signaling state. The timing information may define a second time base for extracting GPIO signaling state from the sequence of control messages and virtual GPIO messages. The second time base may be different from the first time base. The timing information may define a state interval corresponding to a duration of GPIO signaling state represented by each virtual GPIO message included in the sequence of control messages and virtual GPIO messages, a delay to be observed before extracting GPIO signaling state from the sequence of virtual GPIO messages or a repetition rate for repeatedly extracting GPIO signaling state from the sequence of control messages and virtual GPIO messages. The series of signaling state of the physical GPIO may be configured to control a peripheral in a remote device accessible through the communication link.

In another example, the apparatus 2100 includes a transceiver circuit configured to couple the apparatus 2100 to a remote device through a communication link, and a controller, processor or FSM configured to receive a batch including a sequence of virtual GPIO messages representing a series of signaling state of physical GPIO, receive a first header that includes timing information configured to control timing of execution of the batch, and extract the GPIO signaling state from the sequence of virtual GPIO messages using the timing information.

The timing information may define a time base for extracting GPIO signaling state from the sequence of virtual GPIO messages. The timing information may define a state interval corresponding to a duration of GPIO signaling state represented by each virtual GPIO message included in the sequence of control messages and virtual GPIO messages, a delay to be observed before extracting GPIO signaling state from the sequence of virtual GPIO messages, or a repetition rate for repeatedly extracting GPIO signaling state from the sequence of control messages and virtual GPIO messages. The controller, processor or FSM may be further configured to control a peripheral using repetitions of the series of signaling state of the physical GPIO.

The processor-readable storage 2118 may include code executable by the processor 2116, a controller of FSM. In a first example, the processor-readable storage 2118 includes code for representing a series of signaling state of physical GPIO in a batch that includes a sequence of control messages and virtual GPIO messages, generating a first header that includes timing information configured to control timing of execution of the batch, transmitting the first header over a communication link, and transmitting the batch over the communication link.

The processor-readable storage 2118 may include code for receiving an event from a processing circuit, and representing the event in one of the message included in the sequence of control messages and virtual GPIO messages. The processor-readable storage 2118 may include code for capturing the series of signaling state from the physical GPIO using a first time base that controls rate of capture of signaling state. The timing information may define a second time base for extracting GPIO signaling state from the sequence of control messages and virtual GPIO messages, the second time base being different from the first time base.

The processor-readable storage 2118 may include code for receiving the series of signaling state of the GPIO from a processing circuit. The timing information may define a state interval corresponding to a duration of GPIO signaling state represented by each virtual GPIO message included in the sequence of control messages and virtual GPIO messages. The timing information may define a delay to be observed before extracting GPIO signaling state from the sequence of control messages and virtual GPIO messages, and/or a repetition rate for repeatedly extracting GPIO signaling state from the sequence of control messages and virtual GPIO messages.

The processor-readable storage 2118 may include code for generating a second header that modifies the timing information provided in the first header, and transmitting the second header over the communication link after transmitting the batch. The series of signaling state of the physical GPIO may be configured to control a peripheral in a remote device accessible through the communication link. The communication link may include a serial bus and/or a wireless network.

In some examples, the processor-readable storage 2118 may include code for receiving a batch including a sequence of control messages and virtual GPIO messages representing a series of signaling state of physical GPIO, receiving a first header that includes timing information configured to control timing of execution of the batch, and extracting the GPIO signaling state from the sequence of control messages and virtual GPIO messages using the timing information.

In some examples, at least one virtual GPIO message in the sequence of control messages and virtual GPIO messages represents an event directed to a processing circuit. The timing information defines a time base for extracting GPIO signaling state from the sequence of control messages and virtual GPIO messages, a state interval corresponding to a duration of GPIO signaling state represented by each virtual GPIO message included in the sequence of control messages and virtual GPIO messages, a delay to be observed before extracting GPIO signaling state from the sequence of control messages and virtual GPIO messages, and/or a repetition rate for repeatedly extracting GPIO signaling state from the sequence of control messages and virtual GPIO messages.

In some examples, the processor-readable storage 2118 includes code for receiving a second header that includes modified timing information, and extracting the GPIO signaling state from the sequence of control messages and virtual GPIO messages using the modified timing information. The processor-readable storage 2118 may include code for controlling a peripheral using repetitions of the series of signaling state of the physical GPIO. The communication link may include a serial bus and/or a wireless network.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method for data communication, comprising:
representing a series of signaling state of physical general-purpose input/output (GPIO) in a batch that is configured to be repetitively executed by a remote device in accordance with an execution mode for the batch and in accordance with timing information configured to control timing of each execution of the batch by the remote device, the batch comprising a sequence of virtual GPIO messages and control messages;
generating a first header that identifies the execution mode for the batch and includes the timing information;
transmitting the first header over a communication link; and
transmitting the batch over the communication link.

2. The method of claim 1, further comprising:
receiving an event from a processing circuit; and
representing the event in a message included in the sequence of virtual GPIO messages and control messages.

3. The method of claim 1, further comprising:
capturing the series of signaling state of the physical GPIO using a first time base that controls rate of capture of signaling state.

4. The method of claim 3, wherein the timing information defines a second time base for extracting GPIO signaling state from the sequence of virtual GPIO messages and control messages during each execution of the batch by the remote device, the second time base being different from the first time base.

5. The method of claim 1, further comprising:
receiving the series of signaling state of the physical GPIO from a processing circuit.

6. The method of claim 1, wherein the timing information defines a state interval corresponding to a duration of GPIO signaling state represented by each virtual GPIO message included in the sequence of virtual GPIO messages and control messages.

7. The method of claim 1, wherein the timing information defines a delay to be observed before extracting GPIO signaling state from the sequence of virtual GPIO messages and control messages during each execution of the batch by the remote device.

8. The method of claim 1, wherein the timing information defines a repetition rate configured to control one or more repeated executions of the batch at the remote device.

9. The method of claim 1, further comprising:
generating a second header that is configured to modify the execution mode for the batch or the timing information provided to the remote device in the first header; and
transmitting the second header over the communication link after transmitting the batch,
wherein the second header is further configured to control one or more executions of the batch by the remote device after transmission of the second header.

10. The method of claim 1, wherein the series of signaling state of the physical GPIO is configured to control a peripheral in the remote device, which is accessible through the communication link.

11. The method of claim 1, wherein the communication link comprises a serial bus.

12. The method of claim 1, wherein the communication link comprises a wireless network.

13. An apparatus for data communication comprising:
a transceiver circuit configured to couple the apparatus to a remote device through a communication link; and
a controller configured to:
represent a series of signaling state of physical general-purpose input/output (GPIO) in a batch that is configured to be repetitively executed by the remote device in accordance with an execution mode for the batch and in accordance with timing information configured to control timing of each execution of the batch by the remote device, the batch comprising a sequence of virtual GPIO messages and control messages;
generate a first header that identifies the execution mode for the batch and includes the timing information;
transmit the first header over the communication link; and
transmit the batch over the communication link.

14. The apparatus of claim 13, wherein the controller is further configured to:
receive a first portion of the series of signaling state of the physical GPIO from a processing circuit; and
capture a second portion of the series of signaling state of the physical GPIO using a first time base that controls rate of capture of signaling state,
wherein the timing information defines a second time base for extracting GPIO signaling state from the sequence of virtual GPIO messages and control messages during each execution of the batch by the remote device, the second time base being different from the first time base.

15. The apparatus of claim 13, wherein the timing information defines a state interval corresponding to a duration of GPIO signaling state represented by each virtual GPIO message included in the sequence of virtual GPIO messages and control messages, a delay to be observed before extracting GPIO signaling state from the sequence of virtual GPIO messages and control messages during each execution of the batch by the remote device, or a repetition rate configured to control one or more repeated executions of the batch at the remote device.

16. The apparatus of claim 13, wherein the series of signaling state of the physical GPIO is configured to control a peripheral in the remote device accessible through the communication link.

17. A method for data communication, comprising:
receiving a batch comprising a sequence of control messages and virtual general-purpose input/output (GPIO) messages representing a series of signaling state of physical GPIO;
receiving a first header that identifies an execution mode for the batch and includes timing information configured to control timing of each execution of the batch; and
repetitively executing the batch in accordance with the execution mode and the timing information, each execution of the batch including extracting GPIO signaling state from the sequence of control messages and virtual GPIO messages using the timing information.

18. The method of claim 17, wherein at least one message in the sequence of control messages and virtual GPIO messages represents an event directed to a processing circuit.

19. The method of claim 17, wherein the timing information defines a time base for extracting GPIO signaling state from the sequence of control messages and virtual GPIO messages during each execution of the batch.

20. The method of claim 17, wherein the timing information defines a state interval corresponding to a duration of GPIO signaling state represented by each virtual GPIO message included in the sequence of control messages and virtual GPIO messages.

21. The method of claim 17, further comprising:
observing a delay defined by the timing information before extracting GPIO signaling state from the sequence of control messages and virtual GPIO messages during each execution of the batch.

22. The method of claim 17, further comprising:
repetitively executing the batch at a rate defined by the timing information.

23. The method of claim 17, further comprising:
receiving a second header that includes an updated execution mode or modified timing information; and
executing one or more repetitions of the batch in accordance with the updated execution mode or the modified timing information.

24. The method of claim 17, further comprising:
controlling a peripheral using repetitions of the series of signaling state of the physical GPIO.

25. The method of claim 17, wherein the batch is received from a serial bus.

26. The method of claim 17, wherein the batch is received from a wireless network.

27. A data communication apparatus comprising:
a transceiver circuit configured to couple the data communication apparatus to a remote device through a communication link; and
a controller configured to:
receive a batch comprising a sequence of control messages and virtual general-purpose input/output (GPIO) messages representing a series of signaling state of physical GPIO;
receive a first header that identifies an execution mode for the batch and includes timing information configured to control timing of each execution of the batch; and
repetitively execute the batch in accordance with the execution mode and the timing information, each execution of the batch including extracting GPIO signaling state from the sequence of control messages and virtual GPIO messages using the timing information.

28. The data communication apparatus of claim 27, wherein the controller is further configured to:
extract GPIO signaling state from the sequence of control messages and virtual GPIO messages in accordance with a time base defined by the timing information during each execution of the batch.

29. The data communication apparatus of claim 27, wherein the timing information defines a state interval corresponding to a duration of GPIO signaling state represented by each virtual GPIO message included in the sequence of control messages and virtual GPIO messages, a delay to be observed before extracting GPIO signaling state from the sequence of control messages and virtual GPIO messages, or a repetition rate for repetitively extracting GPIO signaling state from the sequence of control messages and virtual GPIO messages.

30. The data communication apparatus of claim 27, wherein the controller is further configured to:
control a peripheral using repetitions of the series of signaling state of the physical GPIO.

* * * * *